(12) United States Patent
Pasvandi

(10) Patent No.: US 10,450,813 B2
(45) Date of Patent: Oct. 22, 2019

(54) HYDRAULIC FRACTION DOWN-HOLE SYSTEM WITH CIRCULATION PORT AND JET PUMP FOR REMOVAL OF RESIDUAL FRACKING FLUID

(71) Applicant: Salavat Anatolyevich Kuzyaev, Yekaterinburg (RU)

(72) Inventor: Marie Pasvandi, Limassol (CY)

(73) Assignee: SALAVAT ANATOLYEVICH KUZYAEV, Yekaterinburg (RU)

( * ) Notice: Subject to any disclaimer, the term of this patent is extended or adjusted under 35 U.S.C. 154(b) by 0 days.

(21) Appl. No.: 15/686,660

(22) Filed: Aug. 25, 2017

(65) Prior Publication Data

US 2019/0063171 A1    Feb. 28, 2019

(51) Int. Cl.

| | | |
|---|---|---|
| *E21B 21/06* | (2006.01) | |
| *E21B 21/10* | (2006.01) | |
| *E21B 37/00* | (2006.01) | |
| *F04F 5/24* | (2006.01) | |
| *F04F 5/54* | (2006.01) | |
| *G01F 1/44* | (2006.01) | |
| *E21B 43/267* | (2006.01) | |
| *F04F 5/10* | (2006.01) | |
| *E21B 33/124* | (2006.01) | |
| *E21B 37/08* | (2006.01) | |
| *E21B 49/00* | (2006.01) | |
| *E21B 47/06* | (2012.01) | |

(52) U.S. Cl.
CPC .......... *E21B 21/063* (2013.01); *E21B 21/103* (2013.01); *E21B 33/124* (2013.01); *E21B 37/00* (2013.01); *E21B 37/08* (2013.01); *E21B 43/267* (2013.01); *F04F 5/10* (2013.01); *F04F 5/24* (2013.01); *F04F 5/54* (2013.01); *G01F 1/44* (2013.01); *E21B 47/06* (2013.01); *E21B 49/008* (2013.01)

(58) Field of Classification Search
CPC ...... E21B 21/063; E21B 21/103; E21B 37/00; E21B 43/267; E21B 47/06; F04F 5/54
See application file for complete search history.

(56) References Cited

U.S. PATENT DOCUMENTS

| | | |
|---|---|---|
| 4,183,722 A | 1/1980 | Roeder |
| 4,293,283 A | 10/1981 | Roeder |
| 4,504,195 A | 3/1985 | Binks et al. |
| 4,527,836 A | 7/1985 | Uhri |
| 4,653,586 A | 3/1987 | Skinner |

(Continued)

FOREIGN PATENT DOCUMENTS

| | | |
|---|---|---|
| EP | 0590805 A1 | 4/1994 |
| WO | 9529322 A1 | 11/1995 |

(Continued)

*Primary Examiner* — David J Bagnell
*Assistant Examiner* — Brandon M Duck
(74) *Attorney, Agent, or Firm* — Gordon Rees Scully Mansukhani LLP; David R. Heckadon

(57) ABSTRACT

A down-hole equipment system for hydraulic fracturing, having: a longitudinally extending assembly with a bottom packer; a circulation port positioned above the bottom packer; a hydraulic fracturing port positioned above the circulation port; a top packer positioned above the hydraulic fracturing port; a circulation valve positioned above the top packer; and a jet pump positioned above the circulation valve.

14 Claims, 24 Drawing Sheets

(56) References Cited

U.S. PATENT DOCUMENTS

| | | |
|---|---|---|
| 4,658,893 A | 4/1987 | Black |
| 4,664,603 A | 5/1987 | Priestly |
| 4,726,420 A | 2/1988 | Weeks |
| 4,744,730 A | 5/1988 | Roeder |
| 4,878,539 A | 11/1989 | Anders |
| 4,988,389 A | 1/1991 | Adamache et al. |
| 5,000,264 A | 3/1991 | Snider |
| 5,055,002 A | 10/1991 | Roeder |
| 5,494,103 A | 2/1996 | Surjaatmadja et al. |
| 5,879,057 A | 3/1999 | Schwoebel et al. |
| 6,446,727 B1 | 9/2002 | Zemlak et al. |
| 6,520,255 B2 | 2/2003 | Tolman et al. |
| 6,547,011 B2 | 4/2003 | Kilgore |
| 6,662,874 B2 | 12/2003 | Surjaatmadja et al. |
| 6,712,148 B2 | 3/2004 | Fipke et al. |
| 6,899,188 B2 | 5/2005 | Hughes et al. |
| 7,159,660 B2 | 1/2007 | Justus |
| 7,337,844 B2 | 3/2008 | Surjaatmadja et al. |
| 7,401,651 B2 | 7/2008 | Shkurti |
| 7,516,797 B2 | 4/2009 | Khomynets |
| 7,549,478 B2 | 6/2009 | Khomynets |
| 7,735,568 B2 | 6/2010 | Xu et al. |
| 7,757,762 B2 | 7/2010 | O'Malley |
| 8,061,219 B2 | 11/2011 | Rezgui et al. |
| 8,141,638 B2 | 3/2012 | Tulissi et al. |
| 8,220,547 B2 | 7/2012 | Craig et al. |
| 8,397,808 B2 | 3/2013 | Khomynets |
| 8,490,704 B2 | 7/2013 | Caro et al. |
| 8,544,540 B2 | 10/2013 | Khomynets |
| 8,561,687 B2 | 10/2013 | Moore et al. |
| 8,622,124 B2 | 1/2014 | Eslinger |
| 8,631,877 B2 | 1/2014 | Gewily |
| 8,915,300 B2 | 12/2014 | Sommers et al. |
| 8,978,773 B2 | 3/2015 | Tilley |
| 9,016,119 B2 | 4/2015 | Badri et al. |
| 9,038,452 B2 | 5/2015 | Lee |
| 9,062,544 B2 | 6/2015 | Landsiedel |
| 9,074,470 B2 | 7/2015 | Teichrob |
| 9,206,659 B2 | 12/2015 | Zhang et al. |
| 9,309,731 B2 | 4/2016 | Bedouet et al. |
| 9,309,758 B2 | 4/2016 | Corre et al. |
| 9,341,046 B2 | 5/2016 | Huh et al. |
| 9,375,761 B1 | 6/2016 | Dawson et al. |
| 9,382,793 B2 | 7/2016 | Brennan, III |
| 9,458,686 B2 | 10/2016 | Sherman |
| 2004/0071557 A1 | 4/2004 | Khomynets |
| 2005/0133226 A1 | 6/2005 | Lehman |
| 2005/0155773 A1 | 7/2005 | Wetzel et al. |
| 2006/0196674 A1 | 9/2006 | Butler et al. |
| 2006/0213670 A1 | 9/2006 | Bishop et al. |
| 2007/0000666 A1 | 1/2007 | Vozniak et al. |
| 2007/0158073 A1 | 7/2007 | Green |
| 2008/0115934 A1 | 5/2008 | Pettinato et al. |
| 2008/0210424 A1 | 9/2008 | Dusterhoft et al. |
| 2008/0264627 A1 | 10/2008 | Roberts et al. |
| 2008/0314595 A1 | 12/2008 | Khomynets |
| 2009/0025923 A1 | 1/2009 | Patel et al. |
| 2009/0294137 A1 | 12/2009 | Meijer |
| 2010/0157737 A1 | 6/2010 | Miller et al. |
| 2010/0243256 A1 | 9/2010 | Khomynets |
| 2011/0000661 A1 | 1/2011 | Khomynets |
| 2011/0139456 A1 | 6/2011 | Montgomery |
| 2011/0203809 A1 | 8/2011 | Knobloch, Jr. et al. |
| 2011/0214498 A1 | 9/2011 | Rezgui et al. |
| 2011/0247816 A1 | 10/2011 | Carter, Jr. |
| 2012/0043080 A1 | 2/2012 | Edwards |
| 2012/0134853 A1 | 5/2012 | Khomynets et al. |
| 2013/0284026 A1 | 10/2013 | Warncke |
| 2014/0076546 A1 | 3/2014 | Patel |
| 2014/0124199 A1 | 5/2014 | Gorrara et al. |
| 2014/0374091 A1 | 12/2014 | Wilt et al. |
| 2015/0000911 A1 | 1/2015 | Cochran |
| 2015/0041130 A1 | 2/2015 | Cleveland et al. |
| 2015/0083404 A1 | 3/2015 | Wilt et al. |
| 2015/0129203 A1 | 5/2015 | Deutch et al. |
| 2015/0167442 A1 | 6/2015 | Harfoushian |
| 2015/0167652 A1 | 6/2015 | Van Dam et al. |
| 2015/0176384 A1 | 6/2015 | Castillo et al. |
| 2015/0176386 A1 | 6/2015 | Castillo et al. |
| 2015/0285023 A1 | 10/2015 | Miller et al. |
| 2015/0308434 A1* | 10/2015 | Crane .................. F04D 13/12 417/54 |
| 2016/0024884 A1 | 1/2016 | Baudoin |
| 2016/0045888 A1 | 2/2016 | Peters |
| 2016/0084044 A1 | 3/2016 | Shen et al. |
| 2018/0094508 A1* | 4/2018 | Smith .................. E21B 43/04 |
| 2018/0283132 A1* | 10/2018 | Techentien ............ E21B 34/06 |

FOREIGN PATENT DOCUMENTS

| | | |
|---|---|---|
| WO | 2003027431 A2 | 4/2003 |
| WO | 2007050530 A1 | 5/2007 |
| WO | 2007126331 A1 | 11/2007 |
| WO | 2007149008 A1 | 12/2007 |
| WO | 2010148494 A1 | 12/2010 |
| WO | 2013184301 A1 | 12/2013 |
| WO | 2014047228 A1 | 3/2014 |
| WO | 2014098941 A1 | 6/2014 |
| WO | 2014153314 A1 | 9/2014 |
| WO | 2016028513 A1 | 2/2016 |
| WO | 2016144634 A1 | 9/2016 |

* cited by examiner

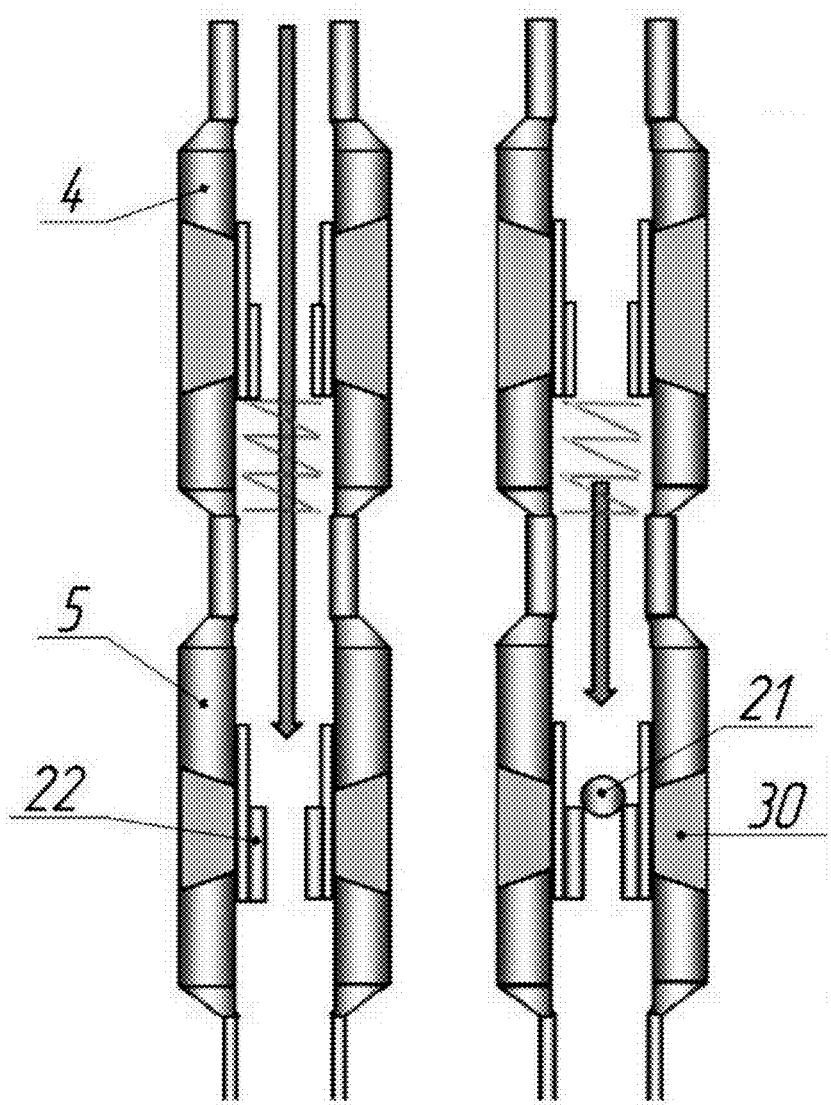

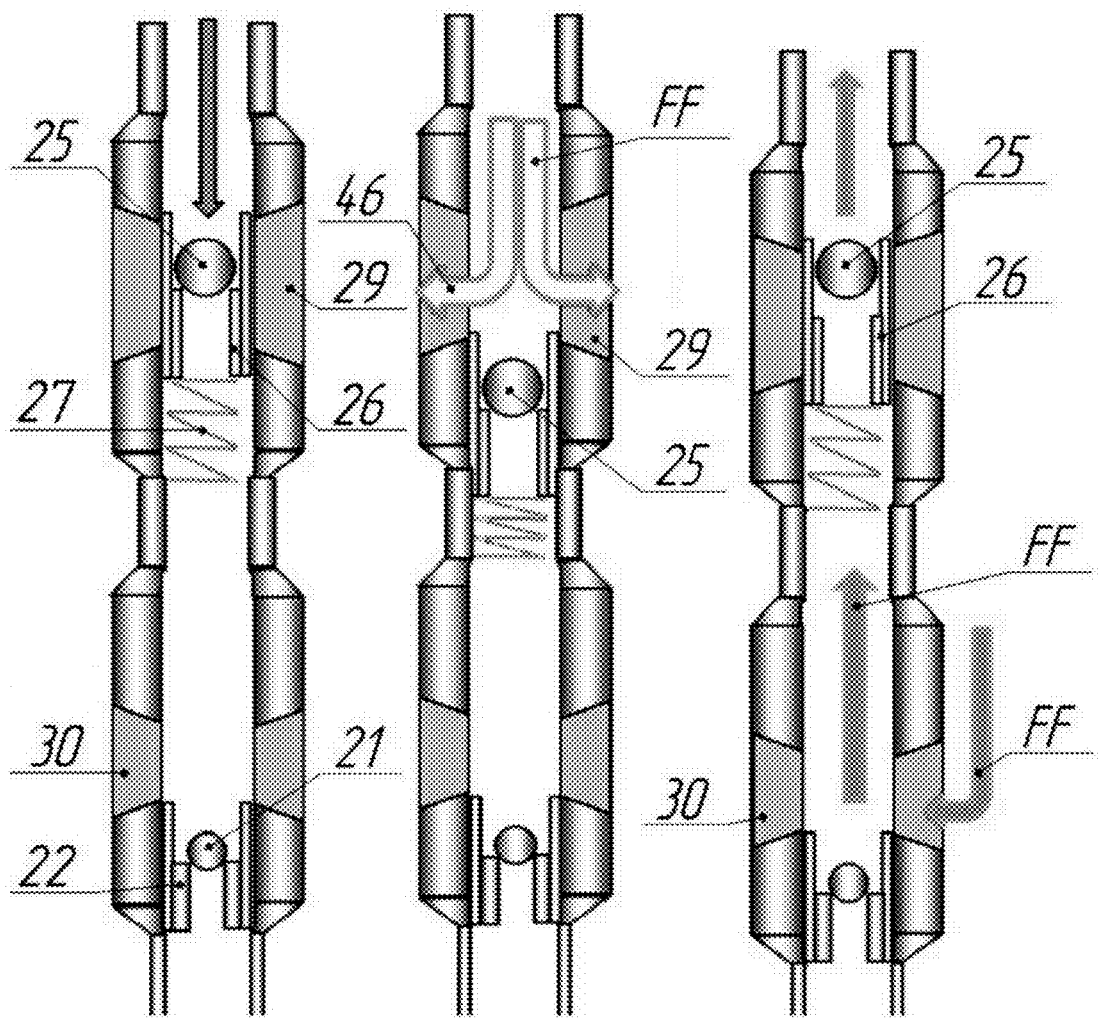

HYDRAULIC FRACTION DOWN-HOLE SYSTEM WITH CIRCULATION PORT AND JET PUMP FOR REMOVAL OF RESIDUAL FRACKING FLUID

TECHNICAL FIELD

The present system relates to down-hole equipment for hydraulic fracturing for oil and gas and provides a method of removing residual fracking fluid and proppant out of a wellbore hole after a hydraulic fracturing operation.

BACKGROUND OF THE INVENTION

Hydraulic fracturing (also known as "fracking") is a natural gas and oil retrieval method that injects pressurized fracking fluids with added solid materials (typically sands or abrasive particles known as "proppants") into a well hole to fracture sub-surface rocks to thereby release natural gas and oil from the rocks for recovery.

A common problem with hydraulic fracturing is that some of the fracking fluid remains in the well hole after the fracking process has been completed. The fracking fluid sitting in the well hole can cause the bottom end of the fracking assembly to become stuck; making it difficult to remove after the hydraulic fracturing has been completed. It would instead be desirable to remove unwanted fracking fluid with proppant from the well hole to assist in avoiding this sticking problem.

As will be shown, the present system provides a variety of approaches to removing residual fracking fluid from the well hole after the completion of the hydraulic fracturing process.

SUMMARY OF THE INVENTION

The present hydraulic fracturing system includes a circulation port and a jet pump and provides two different ways to remove residual fracking fluid from a well bore after completing a hydraulic fracturing operation. In preferred aspects, the jet pump and the circulation port can be used to suction out a region between a top and bottom packer. In other preferred aspects, a circulation valve above the top packer can be used to clean a region inside the tubing above the top packer.

In one aspect, the present invention provides a hydraulic fracturing system, comprising: (a) a longitudinally extending assembly mounted on a production tubing; (b) a bottom packer on the longitudinally extending assembly; (c) a circulation port positioned above the bottom packer on the longitudinally extending assembly; (d) a hydraulic fracturing port positioned above the circulation port on the longitudinally extending assembly; (e) a top packer positioned above the hydraulic fracturing port on the longitudinally extending assembly; (f) a circulation valve positioned above the top packer on the longitudinal assembly; and (g) an insert jet pump adapted to be set by dropping on to the special casing seat positioned above the circulation valve on the longitudinal assembly.

The circulation port and hydraulic fracturing port can both be opened by ball drops (using balls of different sizes). Fracking is performed by: (a) placing a longitudinally extending hydraulic fracturing assembly into a well hole; (b) activating top and bottom packers on the longitudinally extending assembly, thereby sealing a section of the well hole between the top and bottom packers; (c) opening a hydraulic fracturing port on the assembly between the top and bottom packers; (d) injecting pressurized fracking fluid containing proppant down through the longitudinally extending assembly and out of the hydraulic fracturing port, thereby fracturing rocks surrounding the well hole; and then (e) removing oil and gasses from the fractured rocks through the hydraulic fracturing port and up through the longitudinally extending assembly.

After the hydraulic fracturing has been completed, the present system can be used in two different ways to clean out any residual fracking fluid (and associated proppant) still sitting in the well between the top and bottom packers. Both of these methods pressurize the well bore with the addition of fluids (such as cleaning fluids) to flush out the remaining residual fracking fluids with proppants sitting either inside the tubing above the top packer, or in the well section isolated between the top and bottom packers.

In a first method, the residual fracking fluid with proppant sitting between the top and bottom packers is pushed into a circulation port positioned right above the bottom packer, and then returned up to the ground surface through the tubing string of the assembly. This first method specifically involves the steps of: (a) opening a bypass valve in the top packer to let cleaning fluid into the section between the packers; (b) unsealing the top packer; and then (c) pressurizing the well hole, thereby pushing cleaning fluid down along the unsealed top packer and into the opened space between the top and bottom packers. This in turn pushes any remaining fracking fluid and proppant sitting between the top and bottom packers into the circulation port (which sits right on top of the bottom packer). The remaining fracking fluid and proppant then passes back up through the assembly tubing string and out of the well hole, thereby removing the remaining fracking fluid with proppant sitting between the top and bottom packers (as residual fracking fluid is replaced by cleaning fluid). Over time, as more cleaning fluid is injected into the well, it will eventually replace the remaining fracking fluid. Eventually, clear cleaning fluid will return to the ground surface. In various aspects, the jet pump may also be used to create suction between the top and bottom packers, thereby pulling out any remaining fracking fluid with proppant sitting between the top and bottom packers. Optionally, prior to the step of opening the bypass valve in the top packer, the circulation valve above the top packer can be opened and the well pressurized to remove any fracking fluid with proppant sitting inside the tubing above the top packer.

In this first method, the hydraulic fracturing port is opened (for fracking) after the circulation port has already been opened. The hydraulic fracturing port will then be closed and the circulation port will be left open prior to removing the residual fracking fluid. Preferably, both the hydraulic fracturing port and the circulation port are opened by ball drops and the ball dropped into the circulation port is smaller than the ball dropped into the hydraulic fracturing port.

In a second method, after the hydraulic fracturing has been completed, the section between the packers is cleaned mainly with a jet pump dropped into the tubing to be positioned on a seat above the circulation valve. Besides, in this second method, it is preferable that the tubing section above the upper packer is previously cleaned through the circulation valve. The residual fracking fluid with proppant sitting in this section makes it impossible to insert the jet pump module into its seat in the tubing. This cleaning through the circulation valve provides the opportunity to ensure freeing the jet pump seat from the proppant for receiving the insert jet pump module. The second method starts with the steps of: (a) opening a circulation valve above the top packer; and then (b) pressurizing the well hole (for example, with cleaning fluid). The result of this will be that the cleaning fluid will be pushed into the circulation valve (sitting right above the top packer). Then the fracking fluid sitting in the tubing at the level of circulation valve and higher is displaced by the incoming cleaning fluid and pushed up the tubing string to the surface. After the tubing section above the top packer has been cleaned, the circulation valve is closed which is followed by the insert jet pump drop into the assembly. The well is then pressurized. Fluid passage through the jet pump will create a suction force that will be transmitted all the way down to the open circulation port (sitting on the top of the bottom packer). As a result of this suction, any remaining fracking fluid with proppant sitting between the top and bottom packers will be removed.

An advantage of the present system for removing residual fracking fluids (and proppants therein) from a well hole after hydraulic fracturing is that it makes it easier to remove the fracking assembly from the well hole quickly and easily, thereby speeding up the whole process and reducing the risk of emergencies. The system affords in a very short time to clean the well from unstable proppant after hydraulic fracturing and to make well completion right away.

BRIEF DESCRIPTION OF THE DRAWINGS

FIGS. 6 to 10 are sequential sectional views showing the operation of the hydraulic fracturing port and the circulation port prior to, during and following fracking, according to an aspect of the preferred method.

DETAILED DESCRIPTION OF THE DRAWINGS

Figure 1:
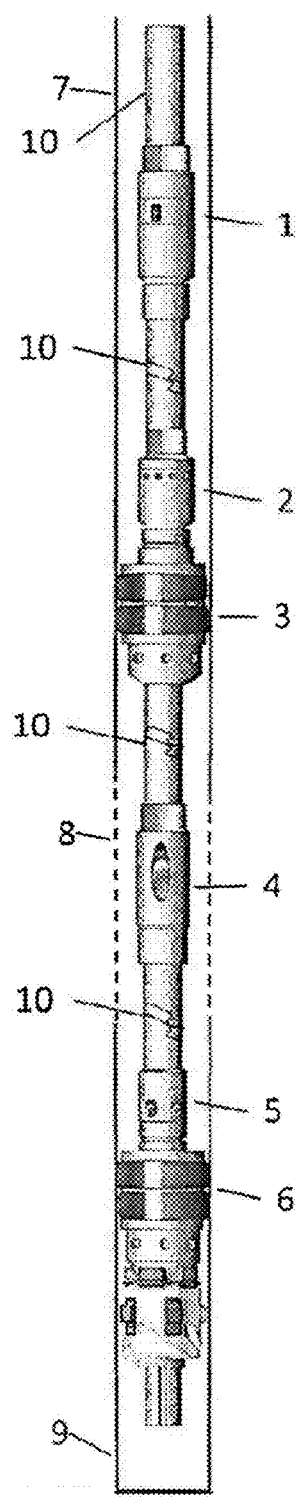
FIG. 1 is a side elevation view of the present system in a well hole.

FIG. 1 is a side elevation view of the present system in a well hole, as follows. A hydraulic fracturing system is placed into well hole 7. Well hole 7 has a bottom end 9. Hydraulic fracturing system comprises: a longitudinally extending assembly 10; a bottom packer 6 on longitudinally extending assembly 10; a circulation port 5 positioned above bottom packer 6; a hydraulic fracturing port 4 positioned above circulation port 5; a top packer 3 positioned above hydraulic fracturing port 4; a circulation valve 2 positioned above top packer 3; and an insert jet pump 1 positioned above circulation valve 2.

Figure 2:
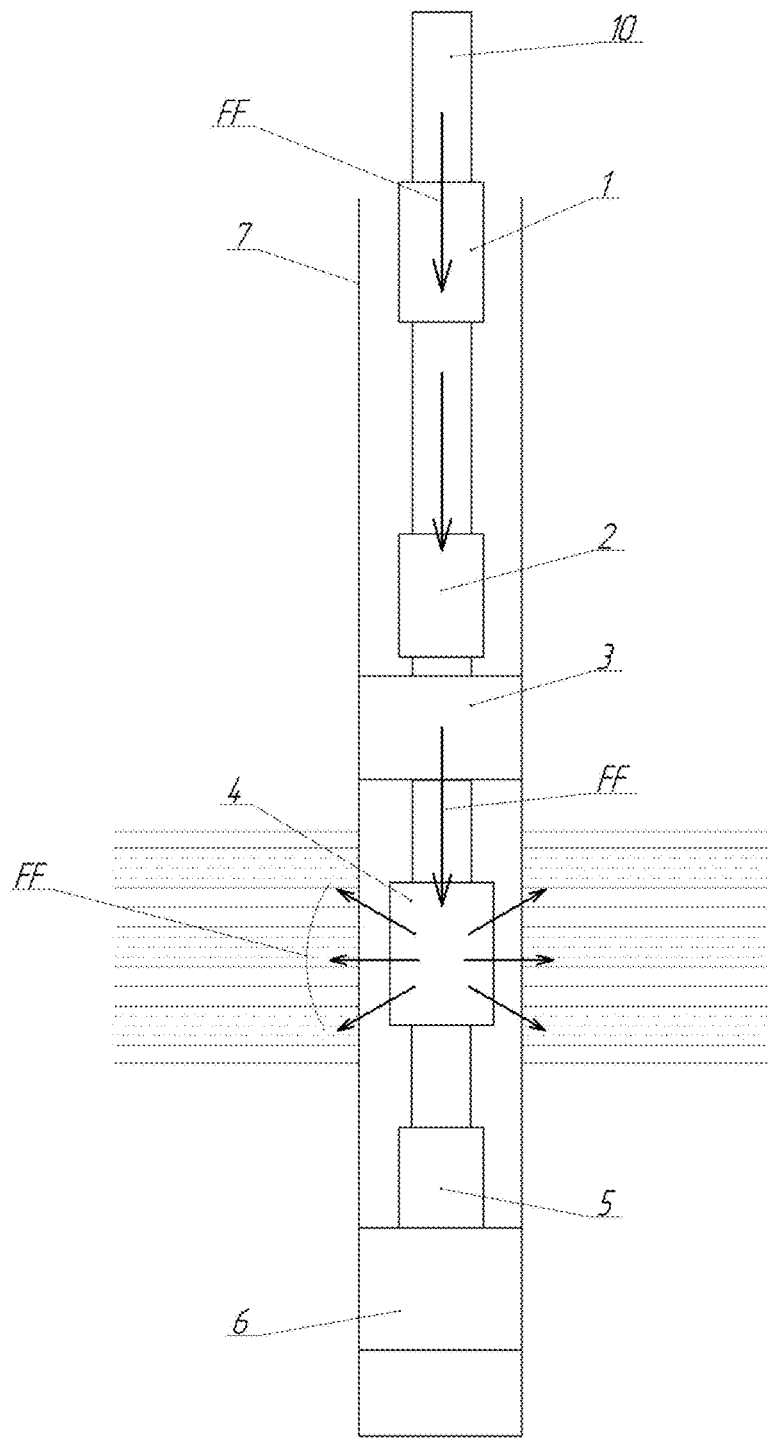
FIG. 2 is a flow diagram during hydraulic fracturing.

As seen in FIG. 2, fracking is performed by first sealing packers 3 and 6 against the side walls of well hole 7 (thereby sealing a section of well between packers 3 and 6). Next, fracking fluid FF is injected down through assembly 10 and out of hydraulic fracturing port 4. This high powered injection of fracking fluid FF into the surrounding rock will release gas and/or oil trapped in the rock such that the gas/oil can be captured at the surface.

Unfortunately, after the fracking has been performed, some residual fracking fluid will tend to remain in a pool sitting on top of bottom packer 6 (in the interval between top packer 3 and bottom packer 6 and as well higher inside the tubing string up to the surface). This residual fracking fluid makes it difficult to remove the fracking assembly. Instead, the bottom of the assembly often tends to become stuck in the well. The present invention provides two different ways in which this residual fracking fluid (sitting in the well between bottom packer 6 and top packer 3) can be removed. In addition, systems and methods are also provided for preliminary removing fracking fluid sitting inside the tubing string above the top packer 3.

Figure 3:
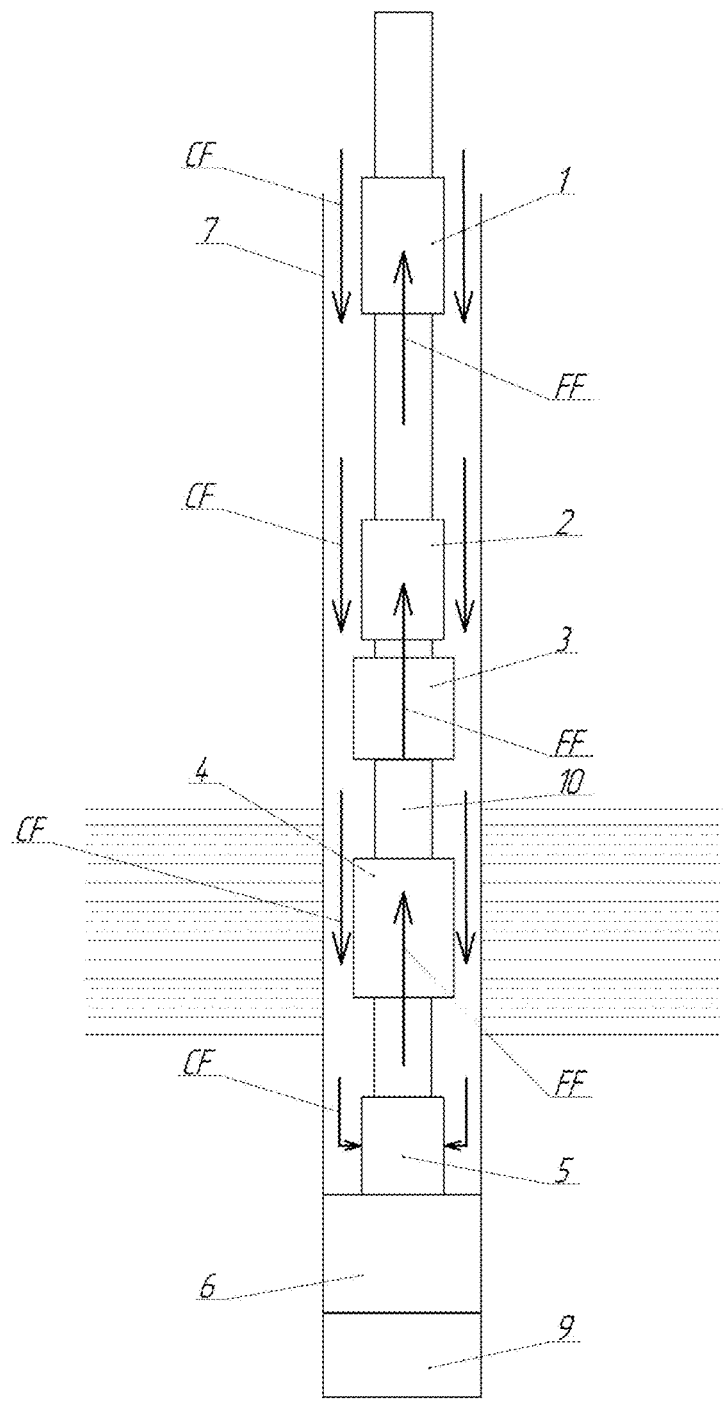
FIG. 3 is a flow diagram during the first method of removing residual fracking fluid and proppant.

In a first method shown in FIG. 3 and explained further throughout the specification, cleaning fluids CF are injected down into well hole 7. Circulation valve 2 remains closed, but top packer 3 is unsealed through opening a bypass valve to let CF go under top packer 3 thus equalizing pressures above and under top packer 3 and after that lifting the tubing string up to remove weight off top packer 3 thus unsealing it. Circulation port 5 will also be opened. As a result, as cleaning fluid is injected down into the well hole 7, it will pass alongside unsealed top packer 3, and enter the space between packers 3 and 6, displacing any residual fracking fluid FF which will be forced into circulation port 5 and then pass up through assembly 10, to be removed at the ground surface. (Fracturing port 4 will remain closed during this time). Over time, the residual fracturing fluid FF will be fully removed and cleaning fluid will reach the top of assembly 10.

In further optional aspects, prior to the step of unsealing top packer 3, the tubing section above top packer 3 can be cleaned by: opening the circulation valve above the top packer, and pressurizing the well hole, thereby pushing cleaning fluid into the tubing through the circulation valve above the top packer, thereby pushing remaining fracturing fluid with proppant sitting inside the tubing above the top packer back up through the assembly and out of the well hole.

Optionally as well, after performing the described steps of cleaning the interval between packers 3 and 6, jet pump 1 can be used for removing residual unstable proppant and performing completion of the well. For this, top packer 3 is again activated; insert jet pump 1 is dropped to be placed on a special seat positioned on the hydraulic fracturing assembly 10 above top packer 3; and then suction is created with jet pump 1, thereby removing remaining unstable proppant sitting in the well between the top and bottom packers 3 and 6.

Figure 4:
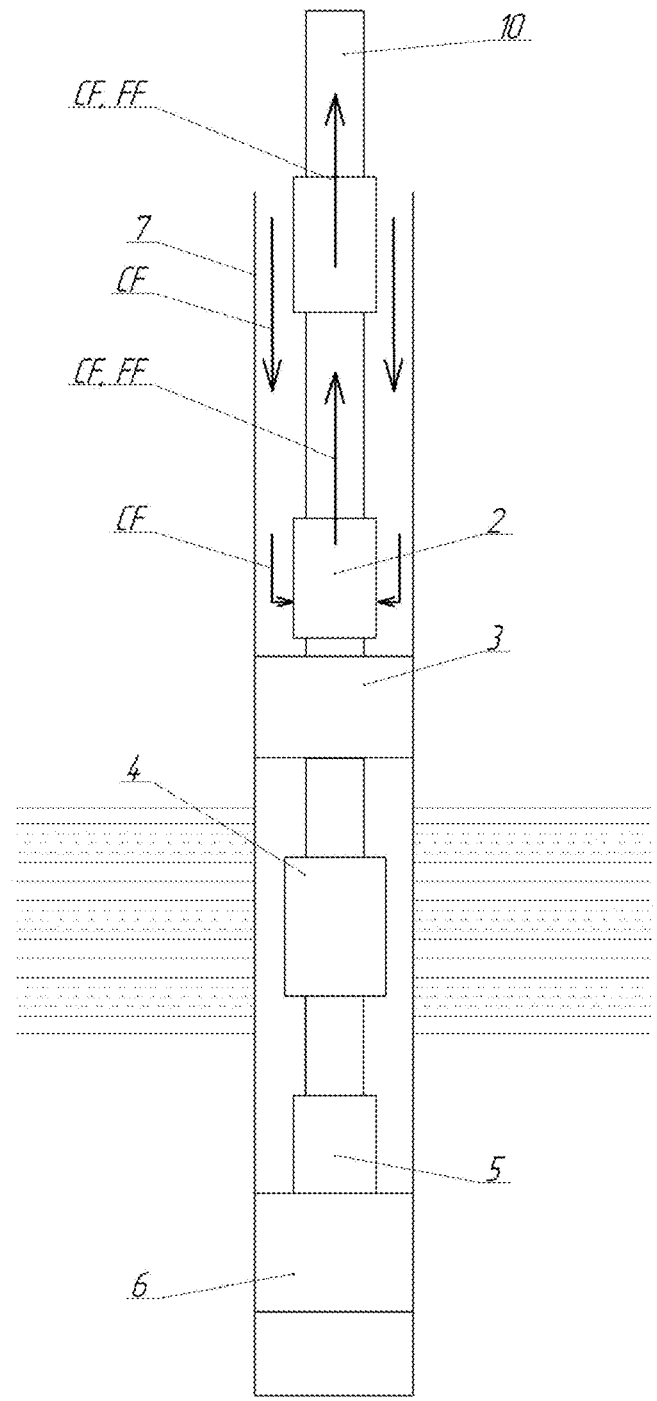
FIG. 4 is a flow diagram during the second method of removing residual fracking fluid and proppant. It shows cleaning of the section between the packers by the jet pump.
Figure 5:
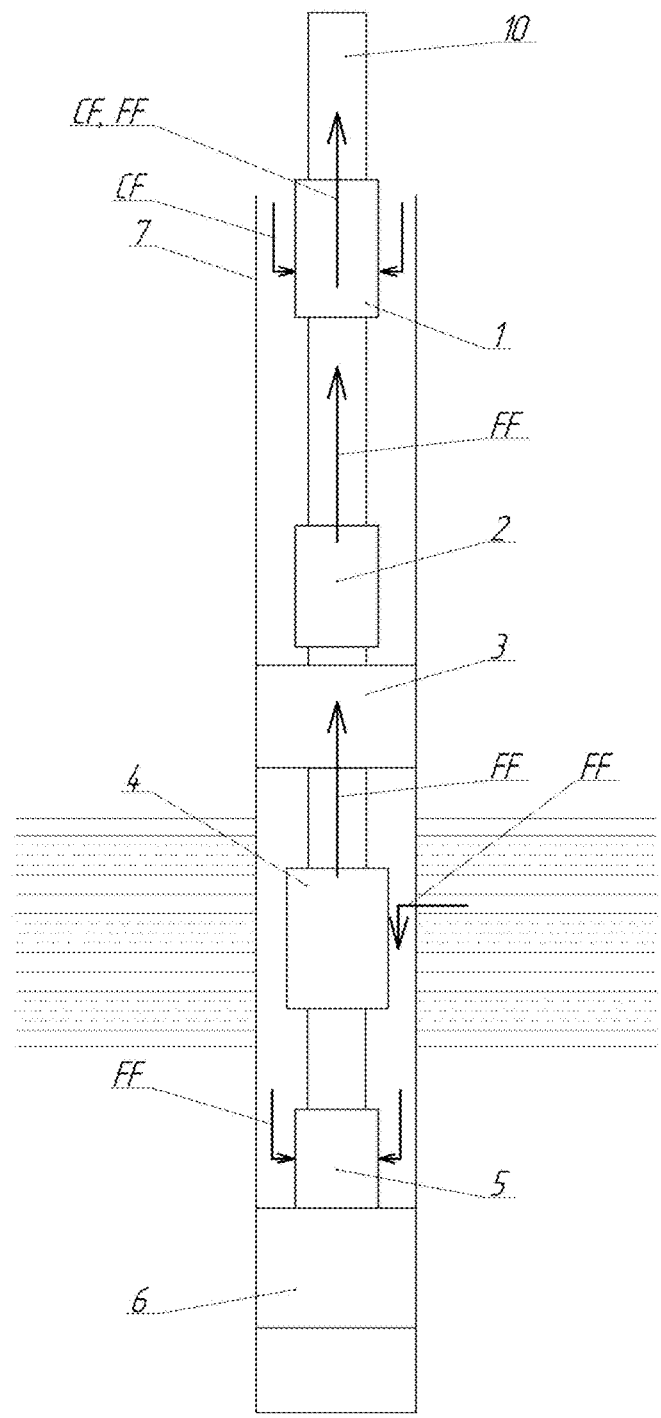
FIG. 5 is a flow diagram showing removal of fracking fluid above a top packer prior to either of the first or second methods of removing fracking fluid between the top and bottom packers.

In a second method shown in FIGS. 4 and 5 and explained further throughout the specification, cleaning fluids CF are also injected down into well hole 7. However, in this second method, primarily circulation valve 2 will be opened such that cleaning fluid flow will be directed through it into the tubing and then upwardly back up to the surface. (Fracturing port 4 will remain closed at this time).

Referring back to FIG. 2, and FIGS. 6 to 10, fracking is performed as follows. First, assembly 10 is placed in position within well hole 7. Next, top and bottom packers 3 and 6 are activated such that they expand outwardly and seal a section 8 of well hole 7 therebetween.

FIG. 4 illustrates a step of cleaning through circulation valve 2 that can be included into either the first or second methods of removing fracking fluid from the well bore after hydraulic fracturing and must if necessary be performed prior to steps of cleaning section between packers 3 and 6. Specifically, prior to opening the bypass valve in the top packer 3 (in the first method), or prior to inserting the jet pump 1 into the assembly (in the second method, FIG. 5); the following steps can be performed. First, circulation valve 2 is opened. Next, the well hole is pressurized, thereby pushing fluid into the circulation valve 2 (which sits above top packer 3), thereby pushing remaining fracturing fluid with proppant sitting inside tubing above top packer 3 back up through the assembly and out of the well hole. As such, the region of tubing above the top packer 3 can be cleaned prior to cleaning the region between packers 3 and 6 (using either of the two above described methods).

In FIG. 6, hydraulic fracturing port 4 and circulation port 5 are both initially closed. Next, as seen in FIG. 7, a small ball 21 is dropped down a center bore of assembly 10, resting in seat 22. Next, as seen in FIG. 8, downward pressure in the center bore of assembly 10 will push ball 21 downwards, thereby pushing seat 22 downwards, thereby opening external holes 30.

Next, as seen in FIG. 9, a second (larger) ball 25 is dropped down a center bore of assembly 10, resting on seat 26 (which sits on spring 27), thereby, when pressurized, pushing seat 26 downwards, opening external holes 29. Next, the fracturing fluid (and proppant therein) is injected from above such that it passes out of holes 29 and into the surrounding rock to release gasses/oil G/O trapped therein. (Thus fracking is carried out at the step shown in FIG. 9).

Finally, as seen in FIG. 10, when the cleaning fluid CF has been injected into the region between packers 3 and 6, it will displace any residual fracking fluid FF sitting on top of bottom packer 6 such that the fracking fluid will instead be pushed into external holes 30 in circulation port 5, and then drawn out at the ground surface. It is to be understood that FIG. 10 also illustrates the situation where the jet pump 1 instead is used to create a suction force in assembly 10 such that the residual fracking fluid FF sitting on top of bottom packer 6 will instead be vacuumed up through external holes 30 in circulation port 5, and then drawn out at the ground surface. As also seen in FIG. 10, as the pressure is reduced after the fracking, spring 27 will cause seat 26 to rise up thereby sealing holes 29. The residual fracking fluid FF passing upwards will return ball 25 to the ground surface.

Further structural details of the present system are seen in the Figures below, as follows.

Figure 14:
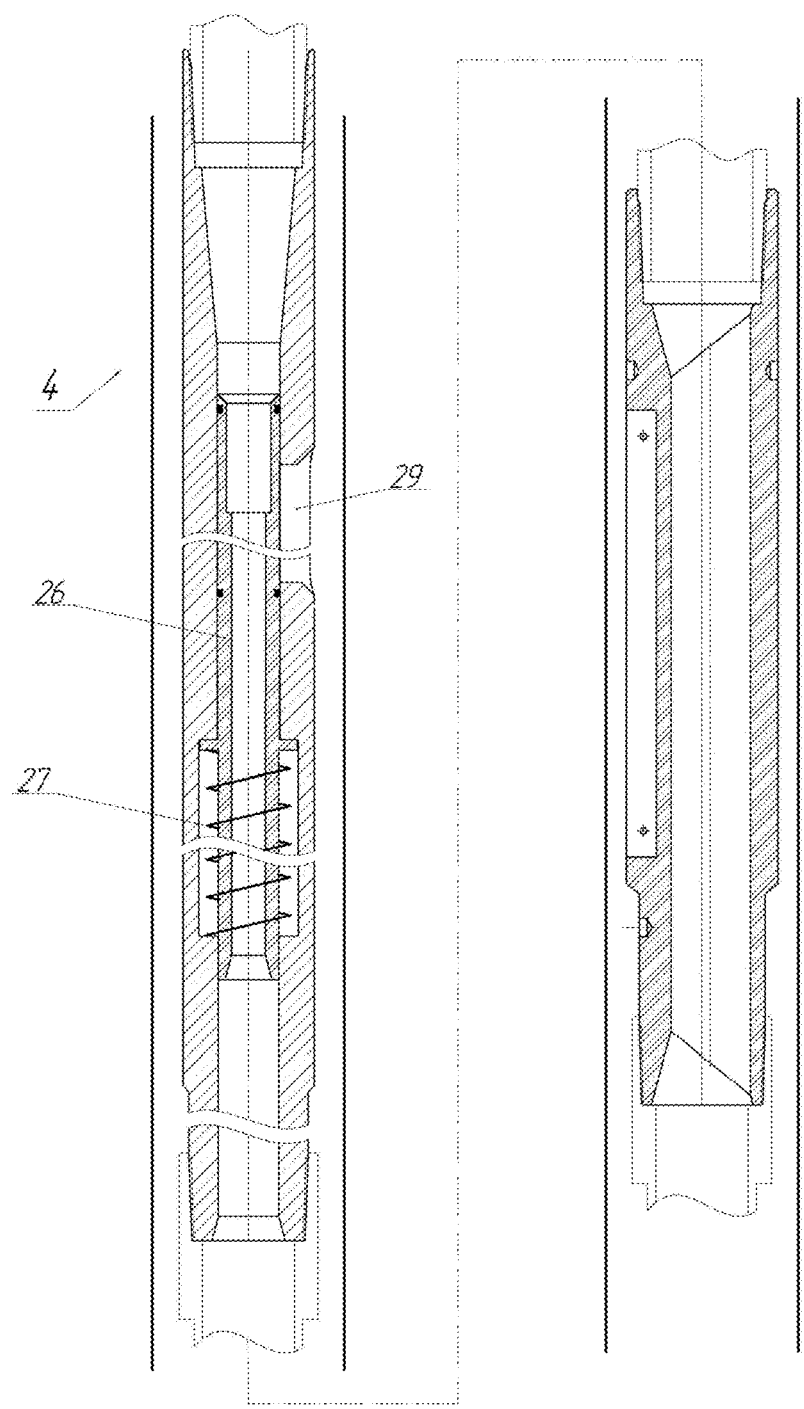
FIG. 14 is a sectional side elevation view of the hydraulic fracturing port prior to fracking.
Figure 19:
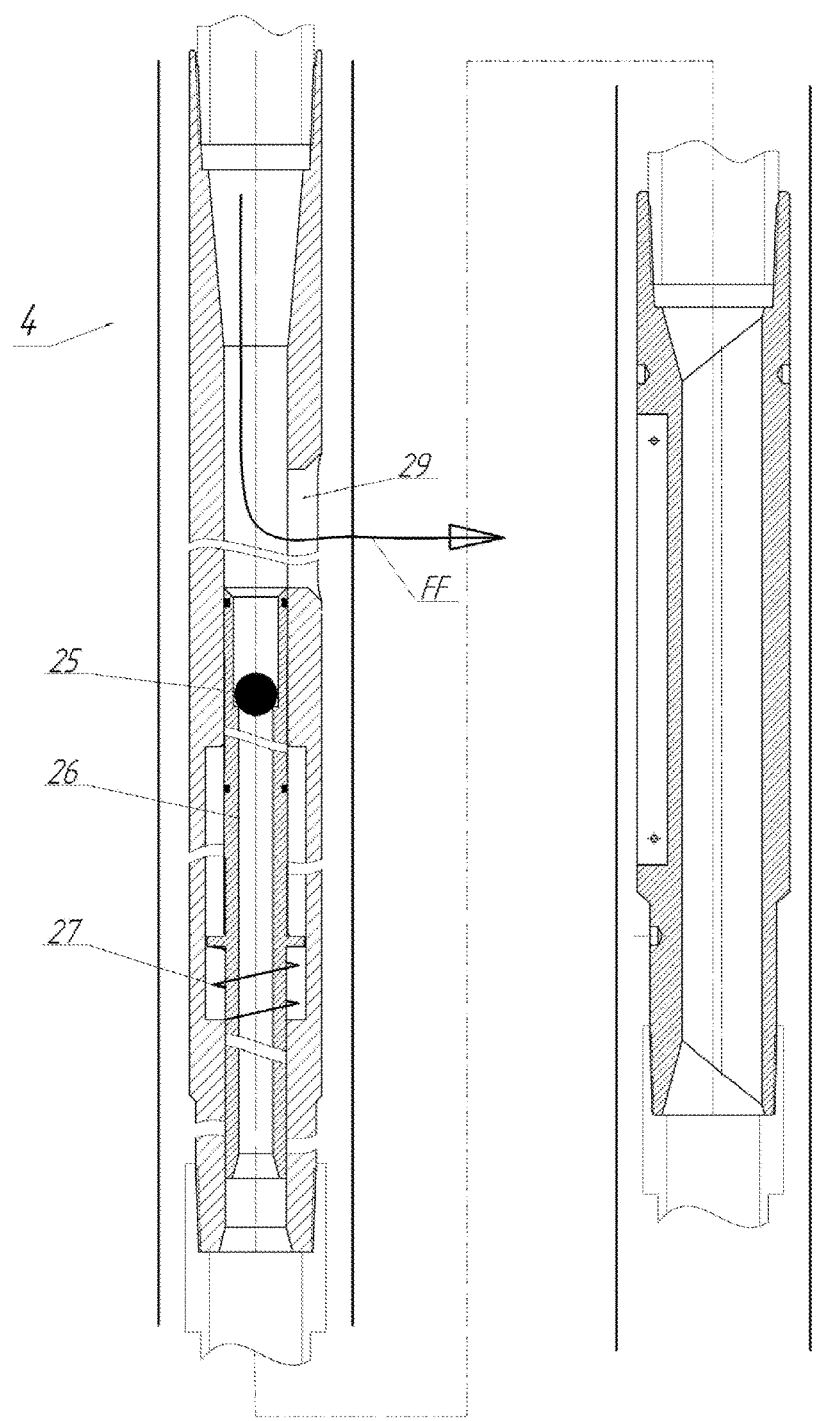
FIG. 19 is a sectional side elevation view of the hydraulic fracturing port during fracking.
Figure 22:
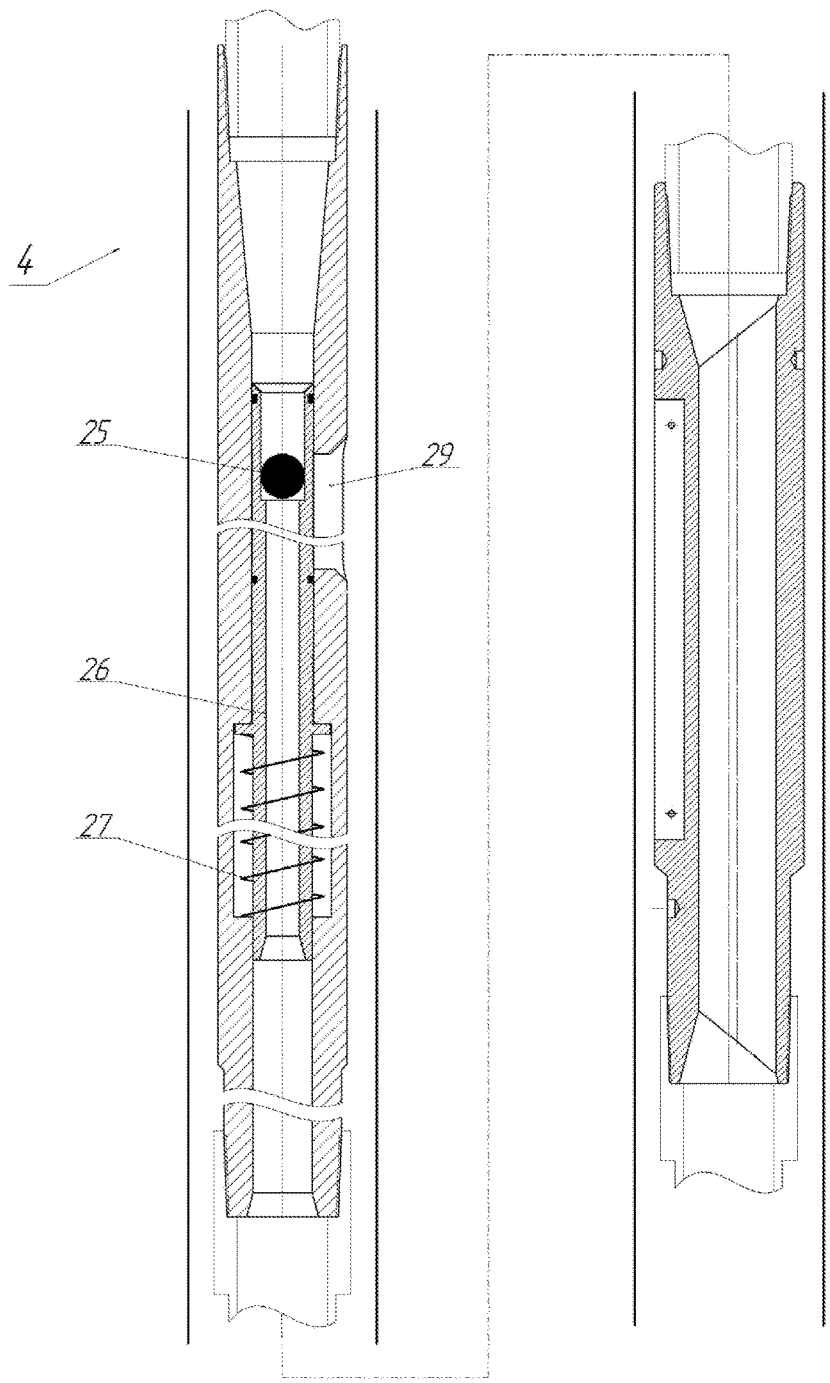
FIG. 22 is a sectional elevation view of the hydraulic fracturing port closed after fracking due to the absence of pressure creation in the tubing string.

Fracking is first carried out as follows. FIG. 14 is a sectional side elevation view of hydraulic fracturing port 4 prior to fracking. FIG. 19 is a sectional side elevation view of hydraulic fracturing port 4 after ball 25 has been dropped therein moving seat 26 downwards, depressing spring 27. Fracking is carried out in the step illustrated in FIG. 19 with fracking fluid FF passing out of external holes 29. Finally, after fracking, as shown in FIG. 22, fracking fluid will no longer be pushed down through the center of the device, and spring 27 will rise, sealing external holes 29 with seat 26.

Figure 15:
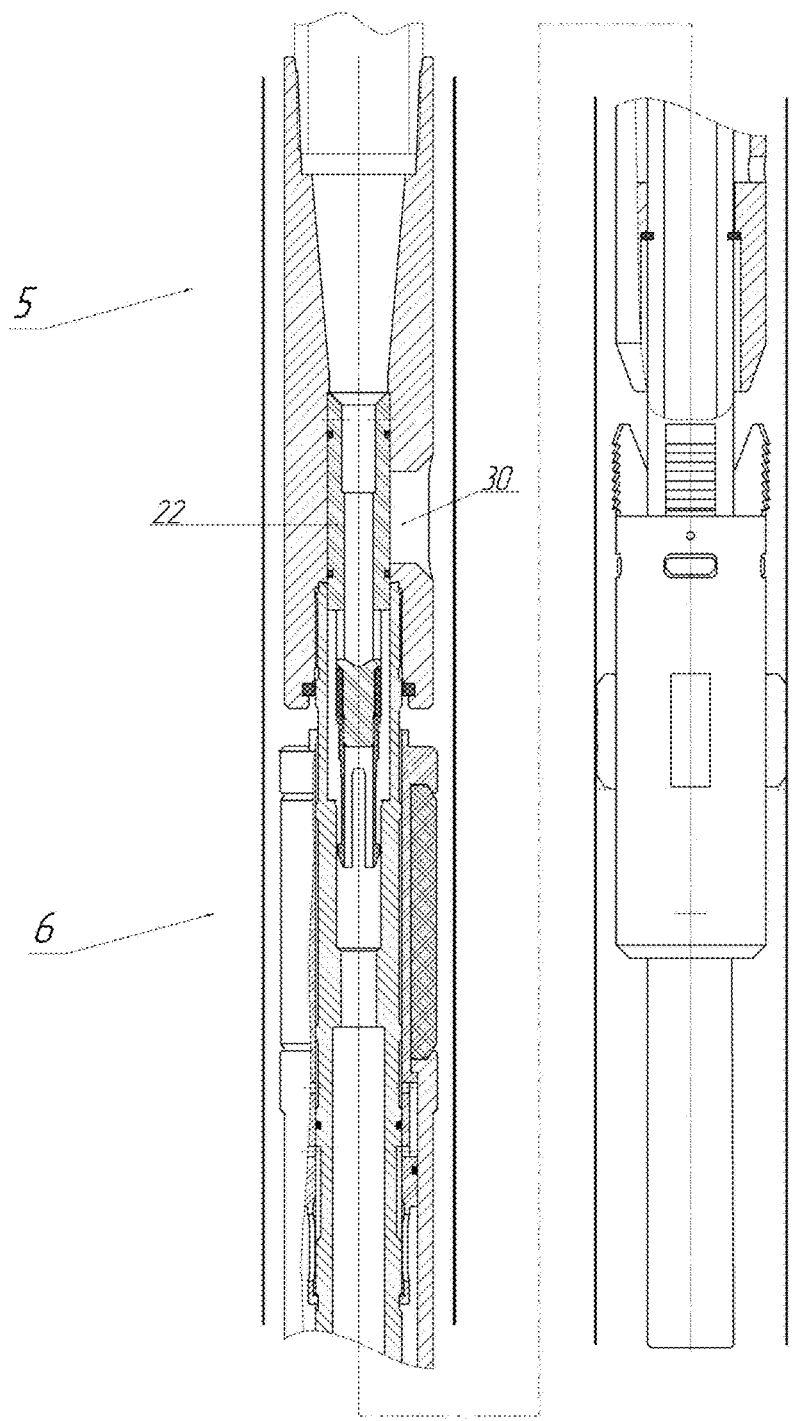
FIG. 15 is a sectional side elevation view of the circulation port and the bottom packer prior to deployment of the bottom packer.
Figure 17:
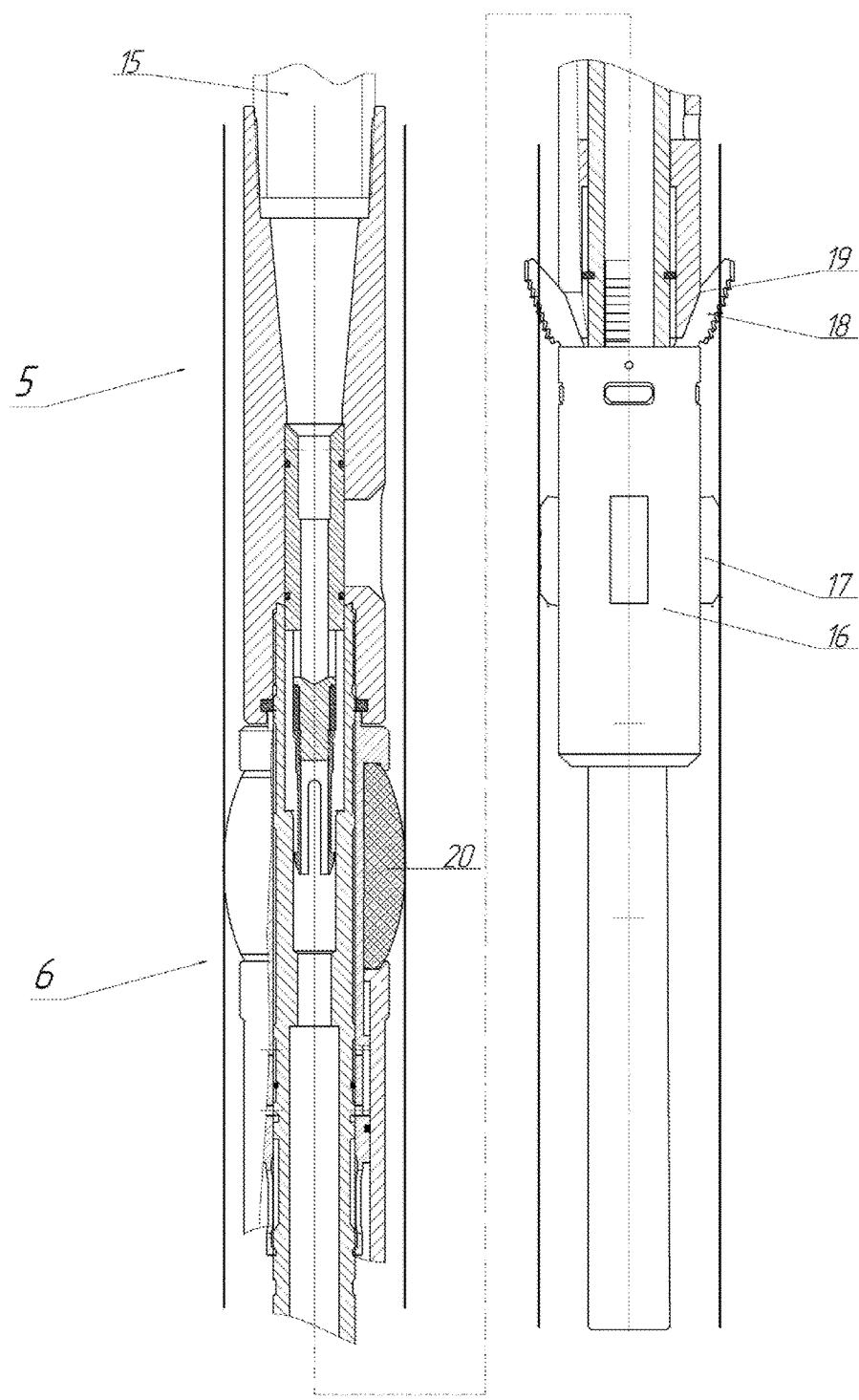
FIG. 17 is a sectional side elevation view of circulation port and the bottom packer after deployment of the bottom packer.
Figure 20:
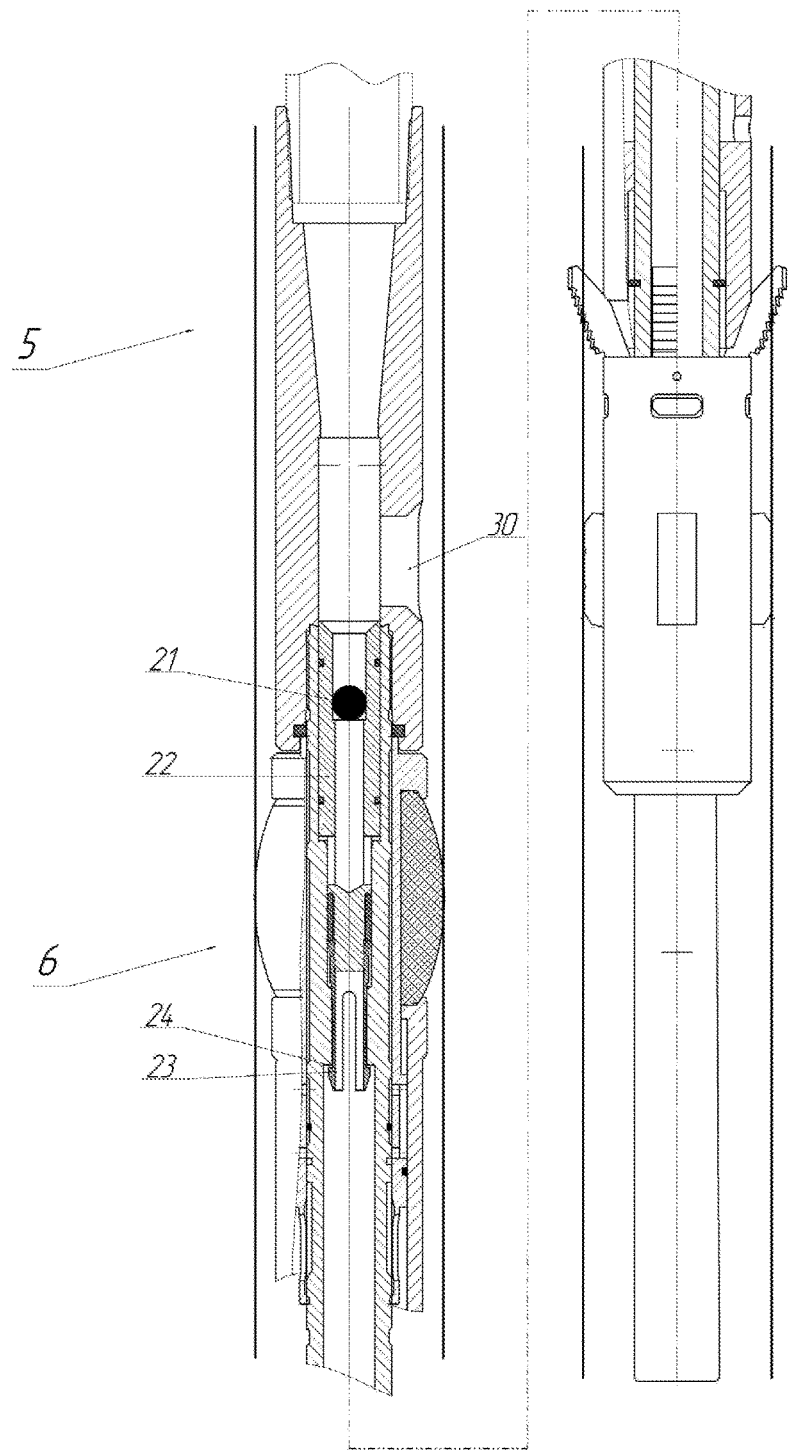
FIG. 20 is a sectional side elevation view of the circulation port and the bottom packer after deployment of the bottom packer.
Figure 25:
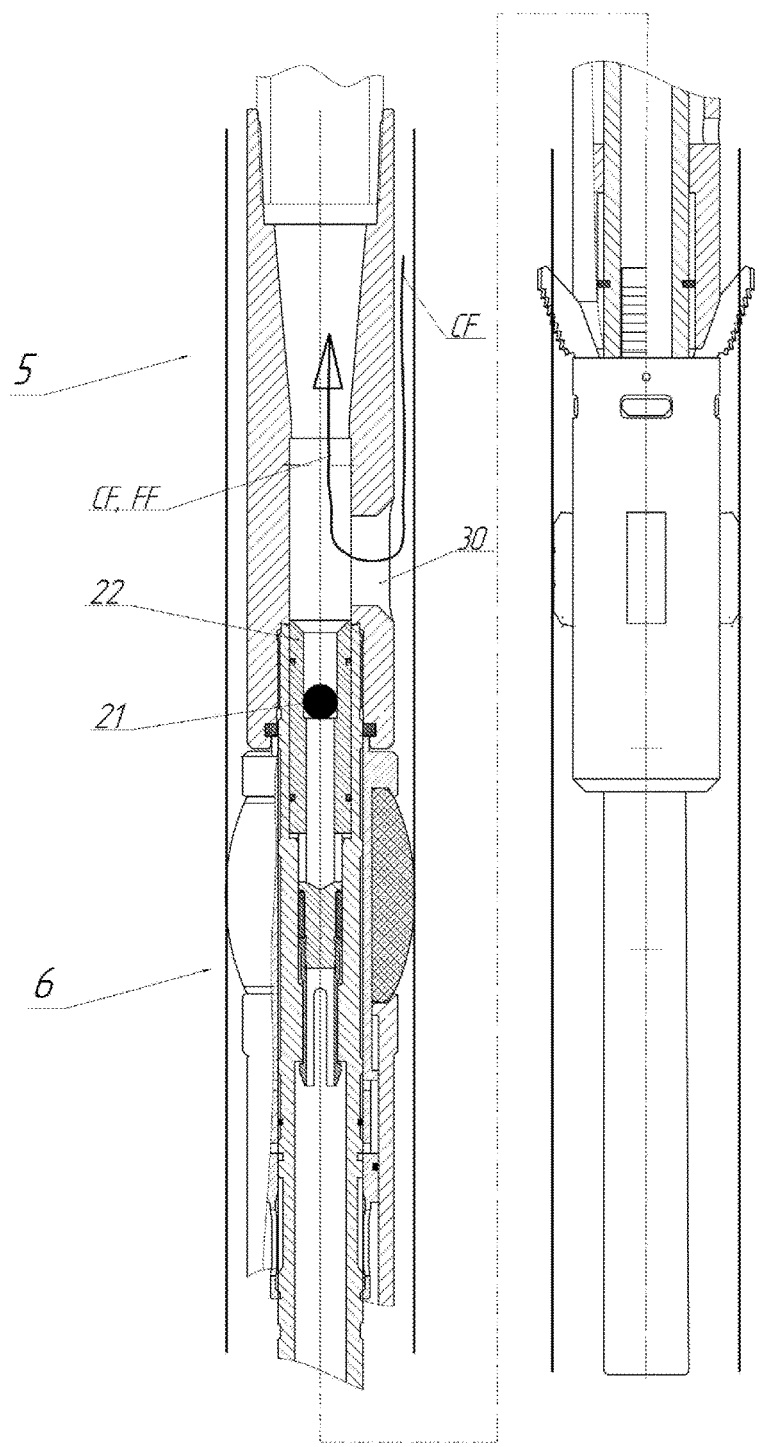
FIG. 25 is a sectional side elevation view of circulation port and the bottom packer after fracking has been performed.

FIG. 15 shows a sectional side elevation view of circulation port 5 and bottom packer 6 prior to deployment of bottom packer 6. Next, FIG. 17 shows the deployment of bottom packer 6 (such that bottom packer 6 seals against the sides of the well bore). Specifically, FIG. 17 shows the bottom packer 6 which is activated when its centralizers 17 contact the sides of the well hole to cause the packer's movable casing 16 with slips 18 to move up along the packer's mandrel. Slips 18 are pushed apart by cone 19 to fix bottom packer 6 in position in the well hole. Advancing the assembly 10 on the tubings 15 downwardly causes cone 19 to widen slips 18 further and fix bottom packer 6 in position. Further advancing the assembly 10 downwardly causes cone 19 to move up along the packer's mandrel forcing the seals 20 to expand and isolate the operation interval. Next, FIG. 20 illustrates a sectional side elevation view after ball 21 has been dropped into seat 22, pushing seat 22 downwardly, thereby opening external holes 30. The seat is fixed in the position by a collet 23 catching on a ledge 24. Finally, FIG. 25 shows residual fracking fluid FF being removed (by either of the two preferred methods described herein). Specifically, FIG. 25 shows the second method where the passage of cleaning fluid into jet pump 1 suctions fracking fluid with proppant from the wellbore interval between top packer 3 and bottom packer 6 to the ground surface.

Figure 13:
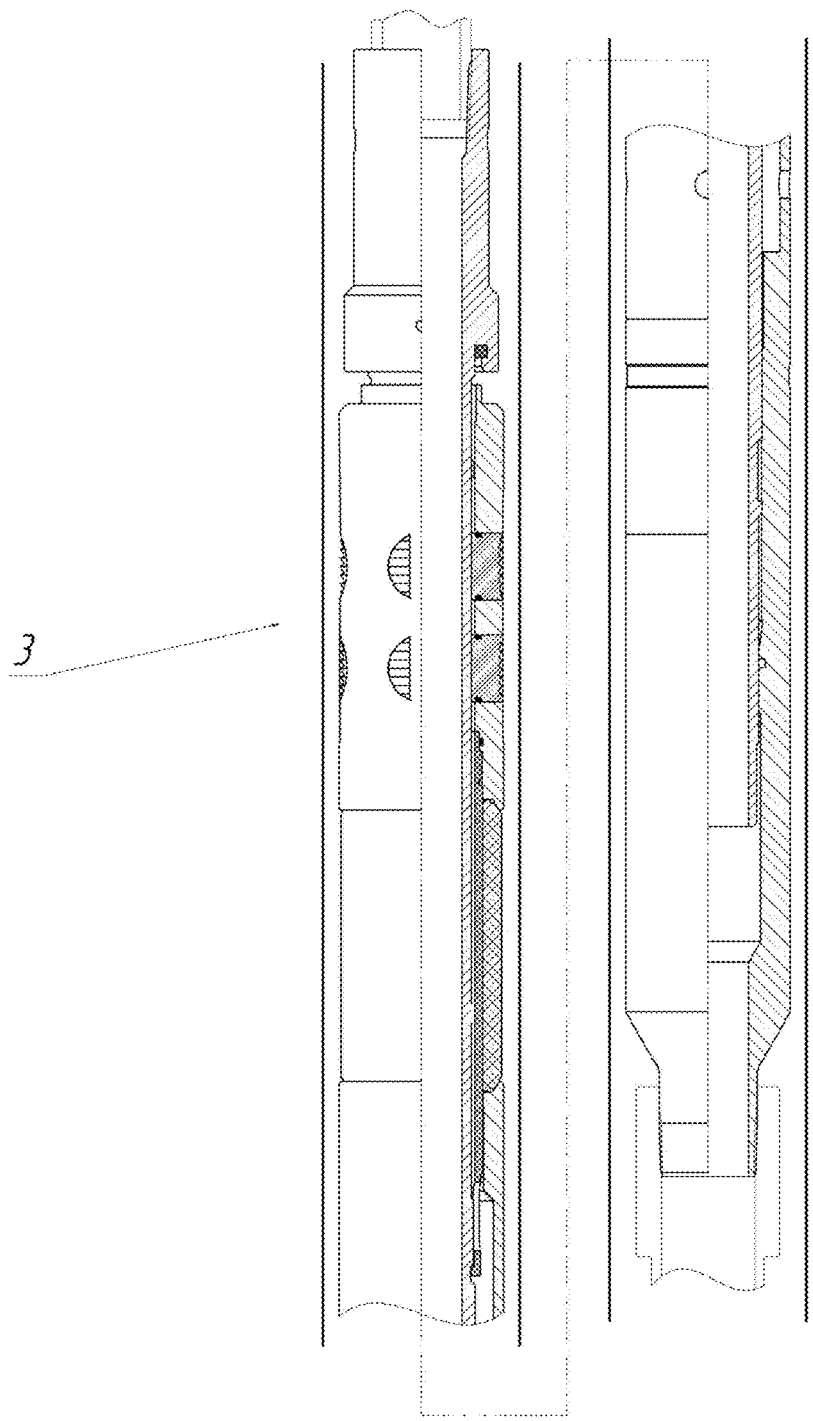
FIG. 13 is a sectional side elevation view of the top packer prior to deployment.
Figure 16:
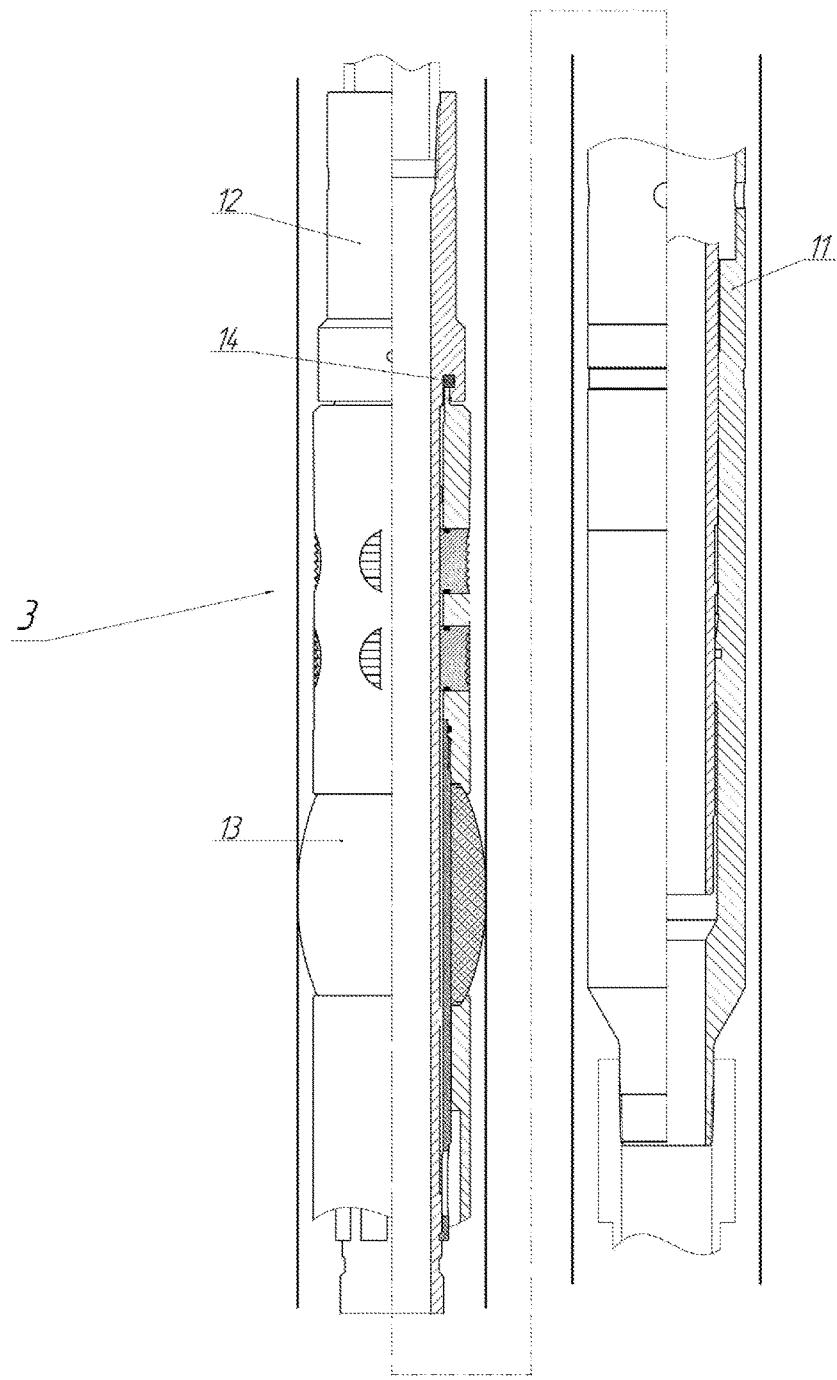
FIG. 16 is a sectional side elevation view of the top packer after deployment.

FIG. 13 is a sectional side elevation view of top packer 3 prior to deployment. FIG. 16 is a sectional side elevation view of top packer 3 after deployment. As seen in FIG. 16, further lowering the fracturing assembly causes top packer 3's movable casing 11 slide along and up its mandrel 12 forcing its seals 13 to expand. Thus top packer 3 becomes fixed at its location.

Figure 18:
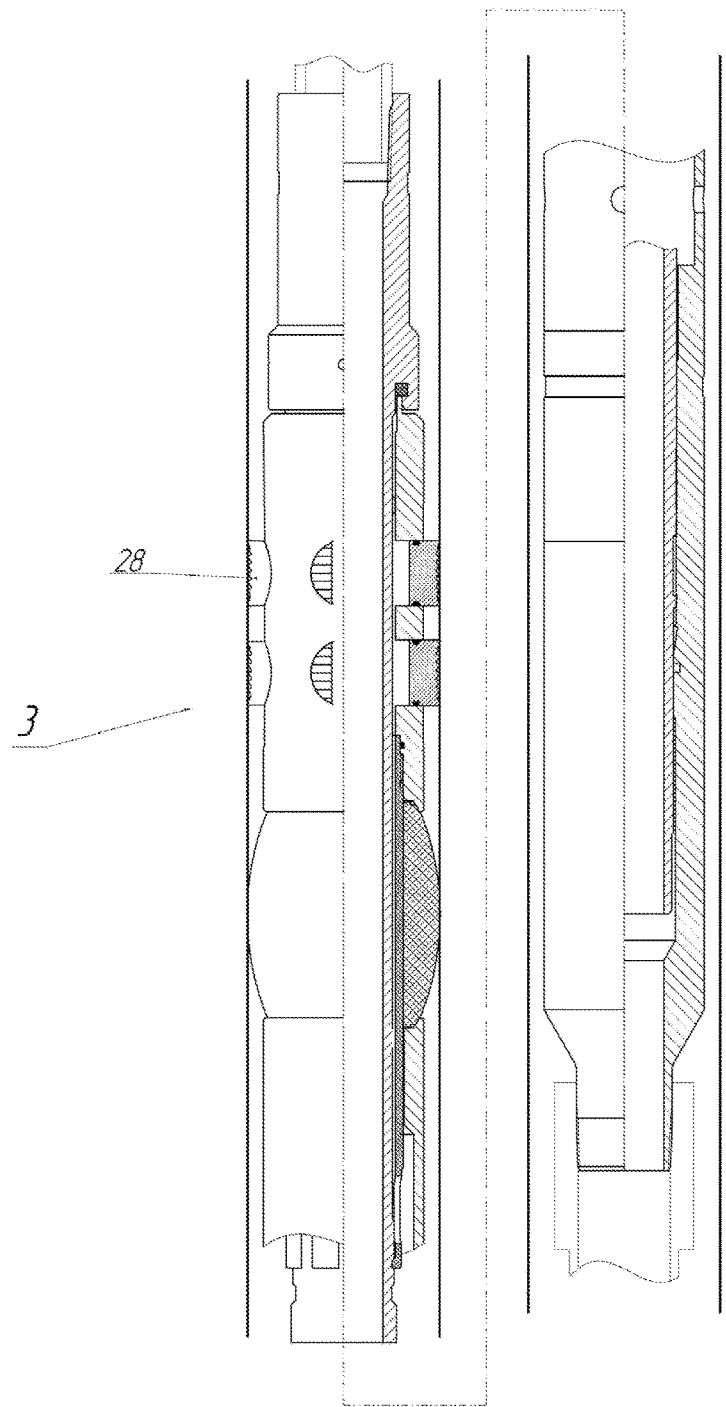
FIG. 18 is a sectional side elevation view of the top packer after deployment showing a fixing ram preventing the assembly from longitudinal movement in the well during the fracking. (The fixing ram protrudes out of the packer under the high pressures created in the tubing string).

FIG. 18 is a sectional side elevation view of top packer 3 after deployment showing fixing rams 28 preventing the assembly from longitudinal movement in the well during the fracking. Fixing rams 28 go out of the packer under high pressure created in the tubing.

To unseal top packer 3 the assembly is raised. Specifically, when raising starts, bypass seal 14 moves from the position shown on FIG. 16 to the position shown on FIG. 24 (the same as on FIG. 13). As such, a bypass channel 44 is open to let fluid go from the interval above top packer 3 to the interval between the packers. Thus pressures above and under top packer 3 are equalized which provides further unsealing of the top packer 3.

Figure 24:
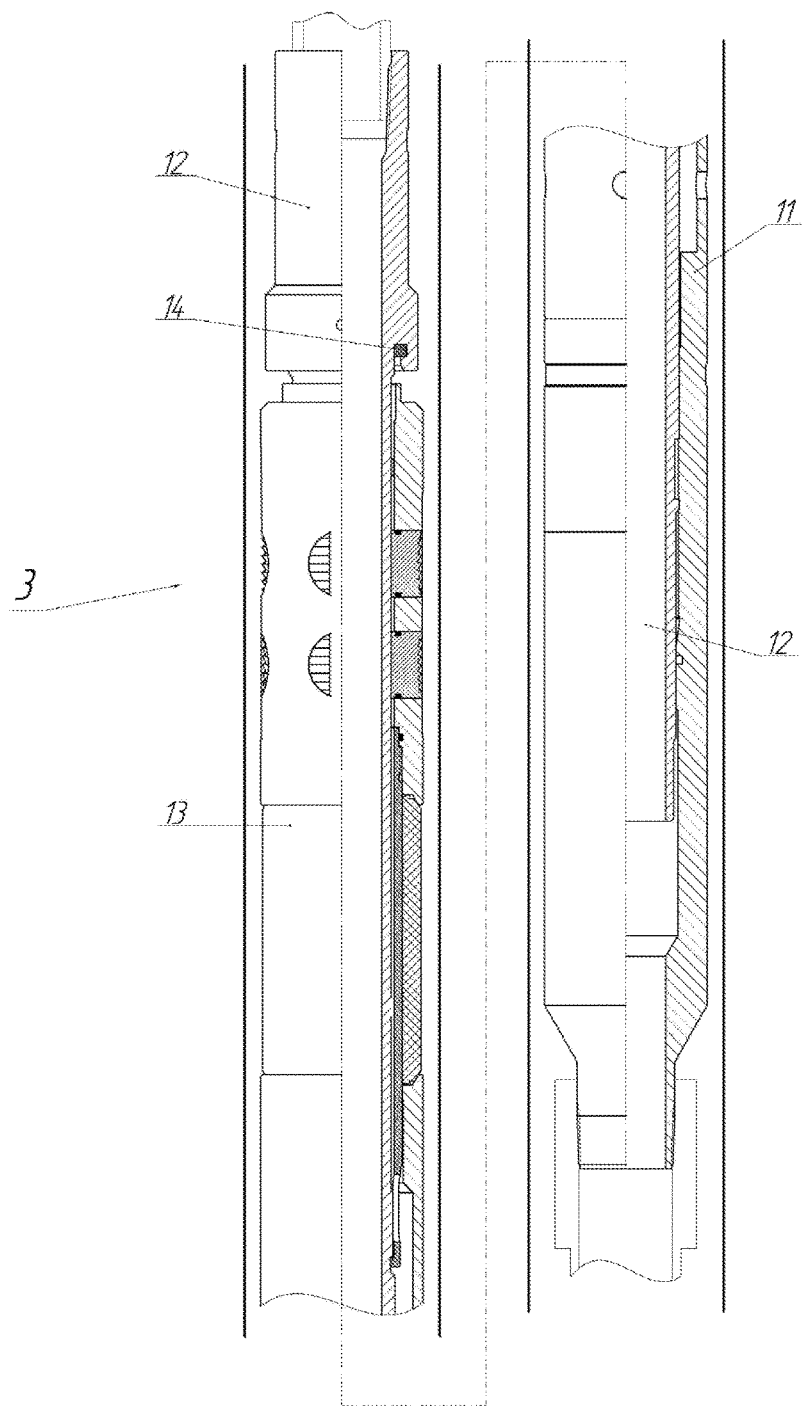
FIG. 24 is a sectional side elevation view of the top packer returned to its original unsealed position.

FIG. 24 shows the next step of top packer 3 unsealing where the assembly is raised further to slack off weight on top packer 3. As a result, top packer 3 returns to its initial position (like in FIG. 13), thus giving the well bore cleaning fluid the way to the circulation port 5.

Figure 27:
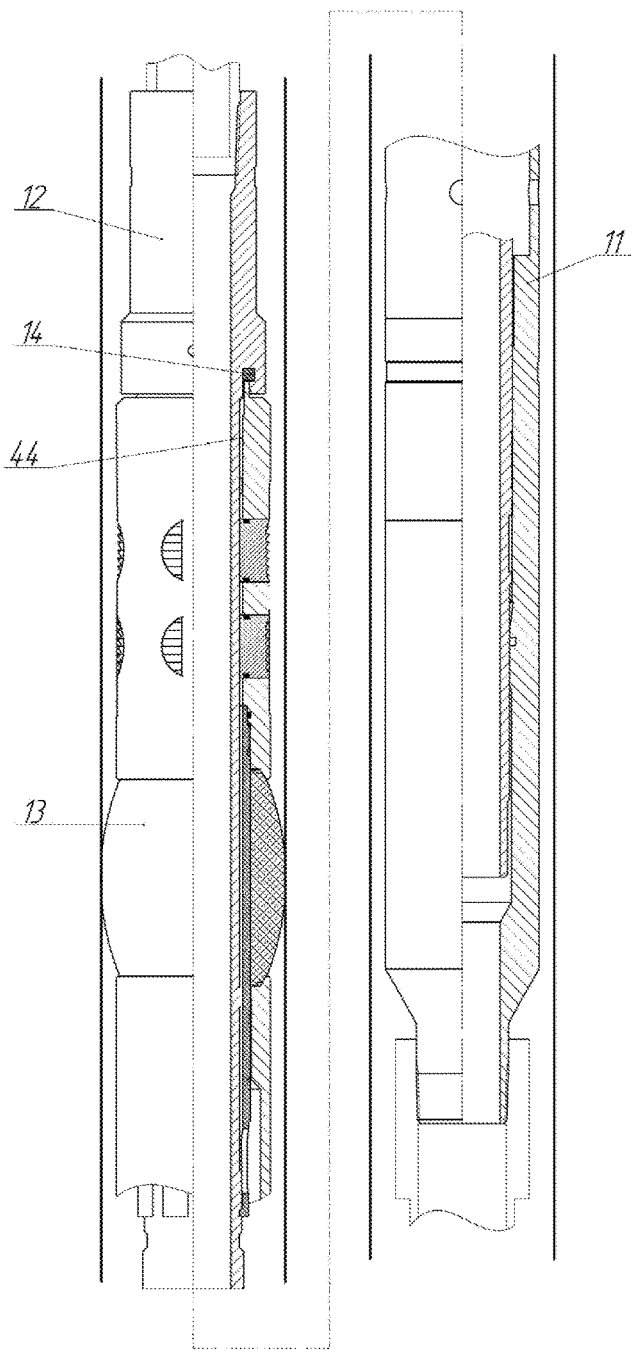
FIG. 27 is a sectional side elevation view of the top packer after deployment (such that the interval between the top and bottom packers is isolated).

FIG. 27 shows the expanded top packer position during the operation of jet pump1. Specifically, assembly 10 is lowered and its weight widens top packer seals 13 again. The interval between the top and bottom packers is thus isolated.

Figure 12:
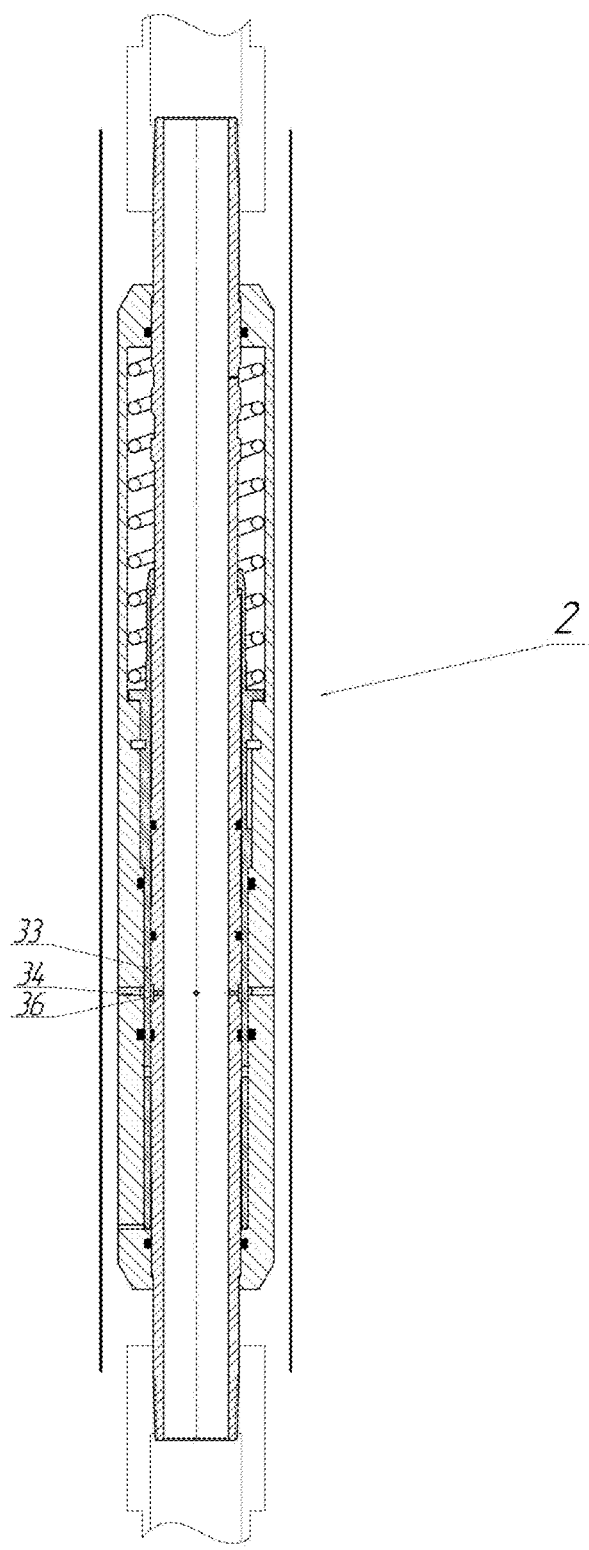
FIG. 12 is a sectional side elevation view of the circulation valve.
Figure 21:
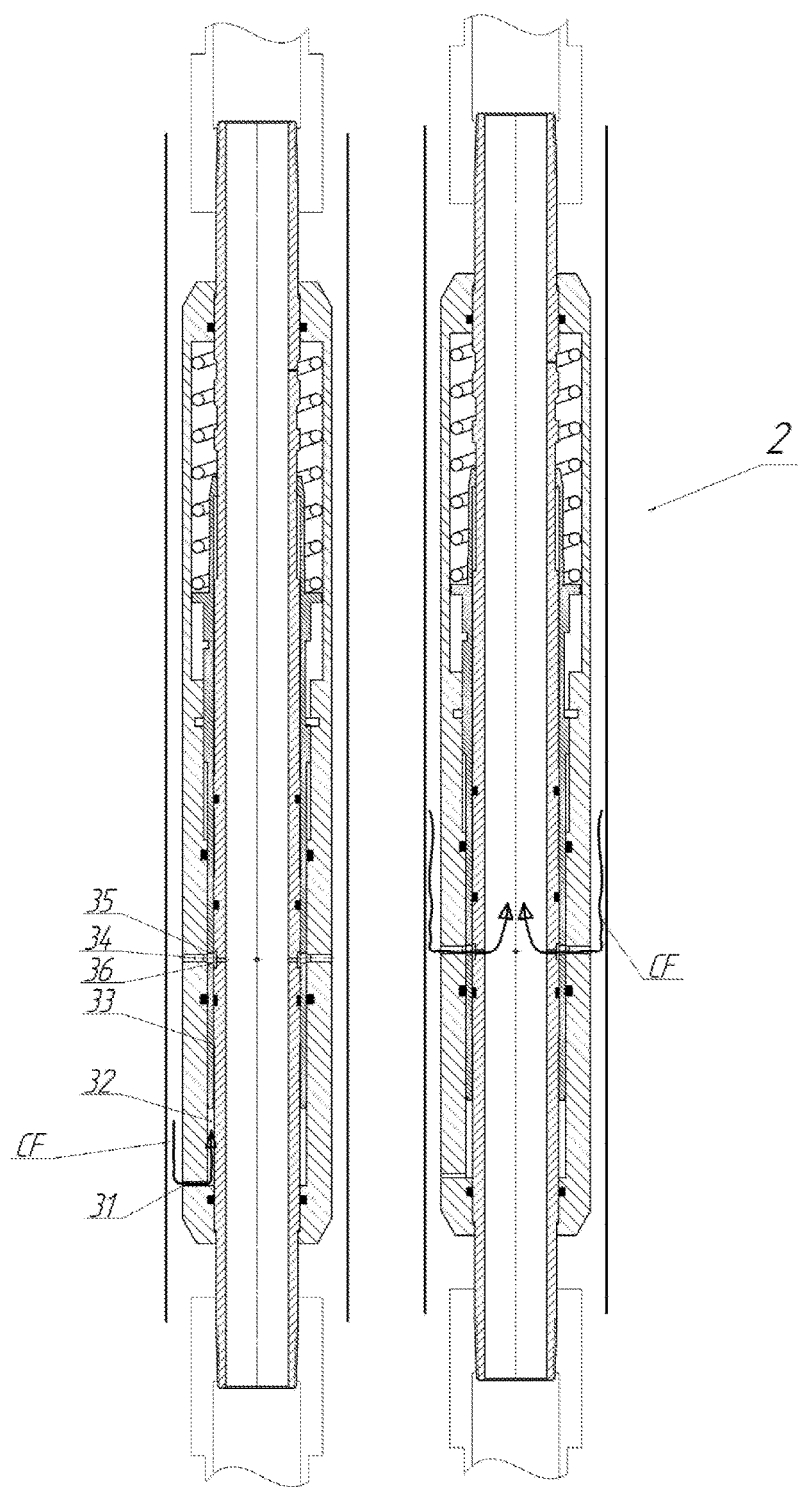
FIG. 21 is a sectional elevation view of the circulation valve being opened (such that cleaning above the circulation valve can be performed).

FIG. 12 is a sectional side elevation view of circulation valve 2. FIG. 21 is a sectional elevation view of circulation valve 2 being opened. Specifically, cleaning fluid CF is pressurized into the well bore. This cleaning fluid CF enters circulation valve chamber 32 through small ports 31 in the valve's casing. The fluid then moves sleeve 33 upwards to make ports 34, 35, 36 match up and thereby open a passage for the cleaning fluid from well bore 7 to enter into circulation valve 2 and rise up to the surface. The result of this fluid circulation will be to displace any residual fracking fluid sitting in the tubing above the circulation valve by incoming cleaning fluid and to push it up through assembly 10 such that it can be recovered at the ground surface.

Figure 23:
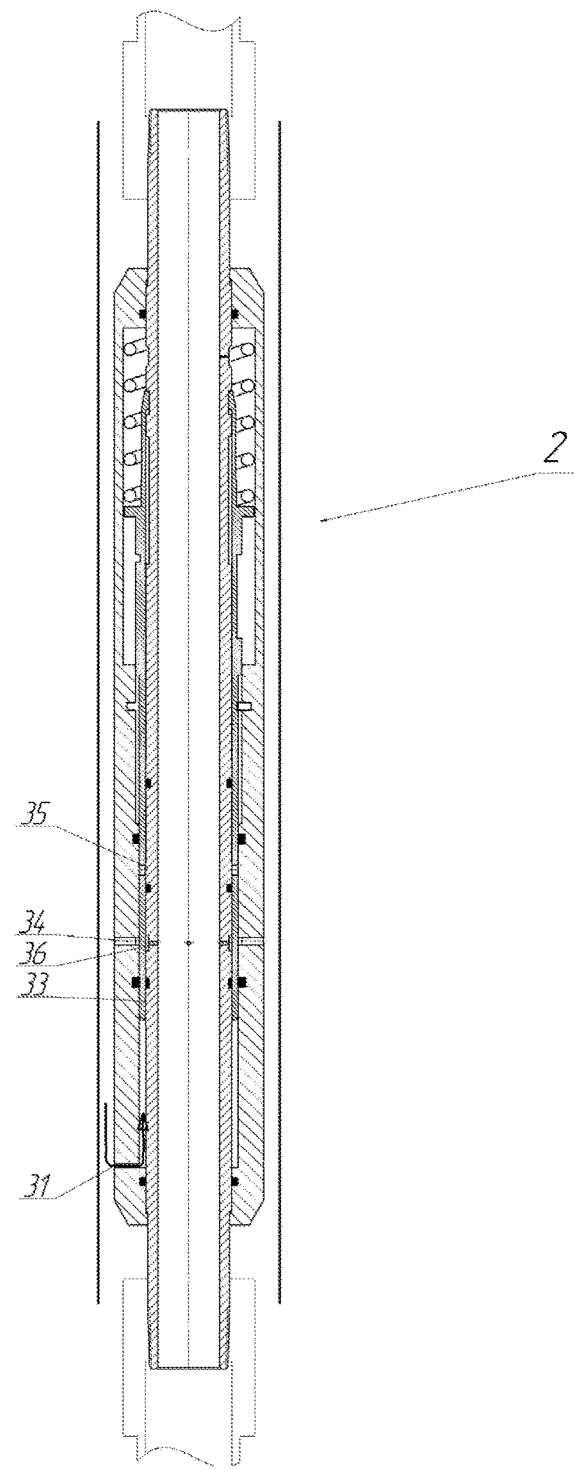
FIG. 23 is a sectional elevation view of the circulation valve after it has been closed.

After the cleaning of the section is complete, the working fluid pressure is raised, sleeve 33 moves higher and closes the ports 34 (as shown in FIG. 23).

Figure 11:
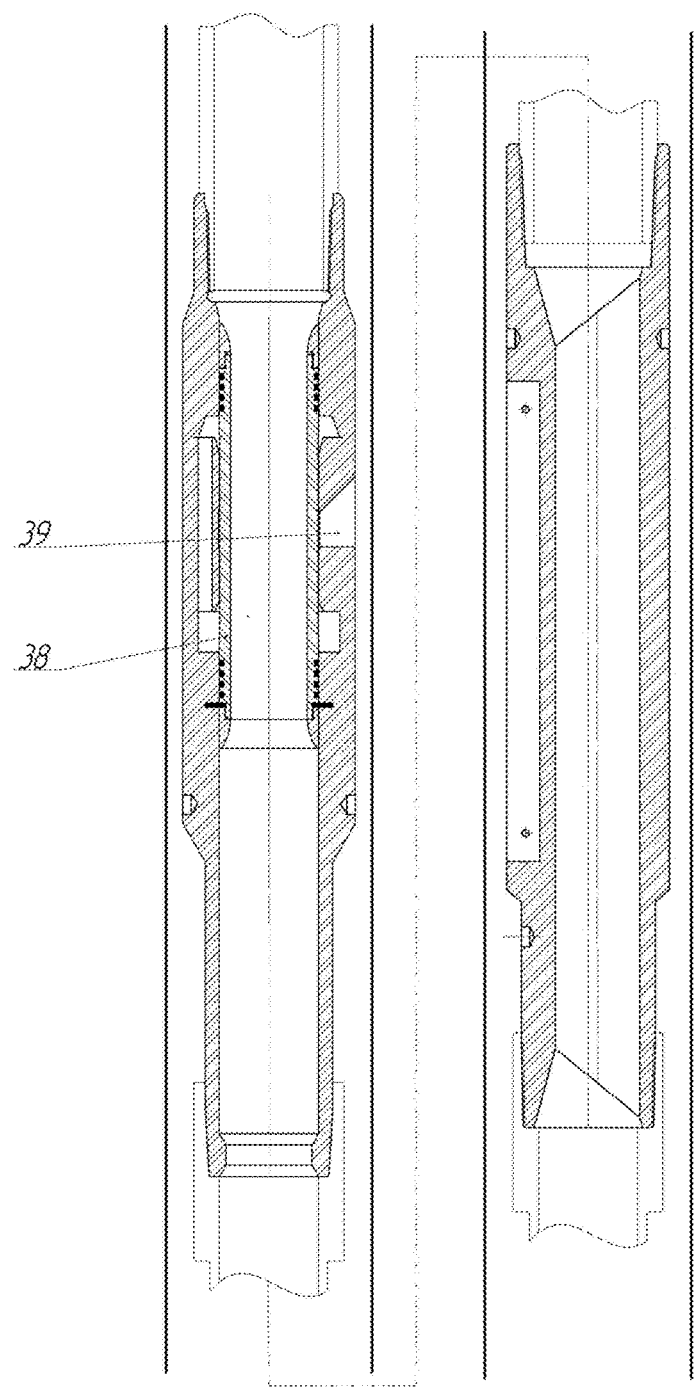
FIG. 11 is a sectional side elevation view of the jet pump casing.
Figure 26:
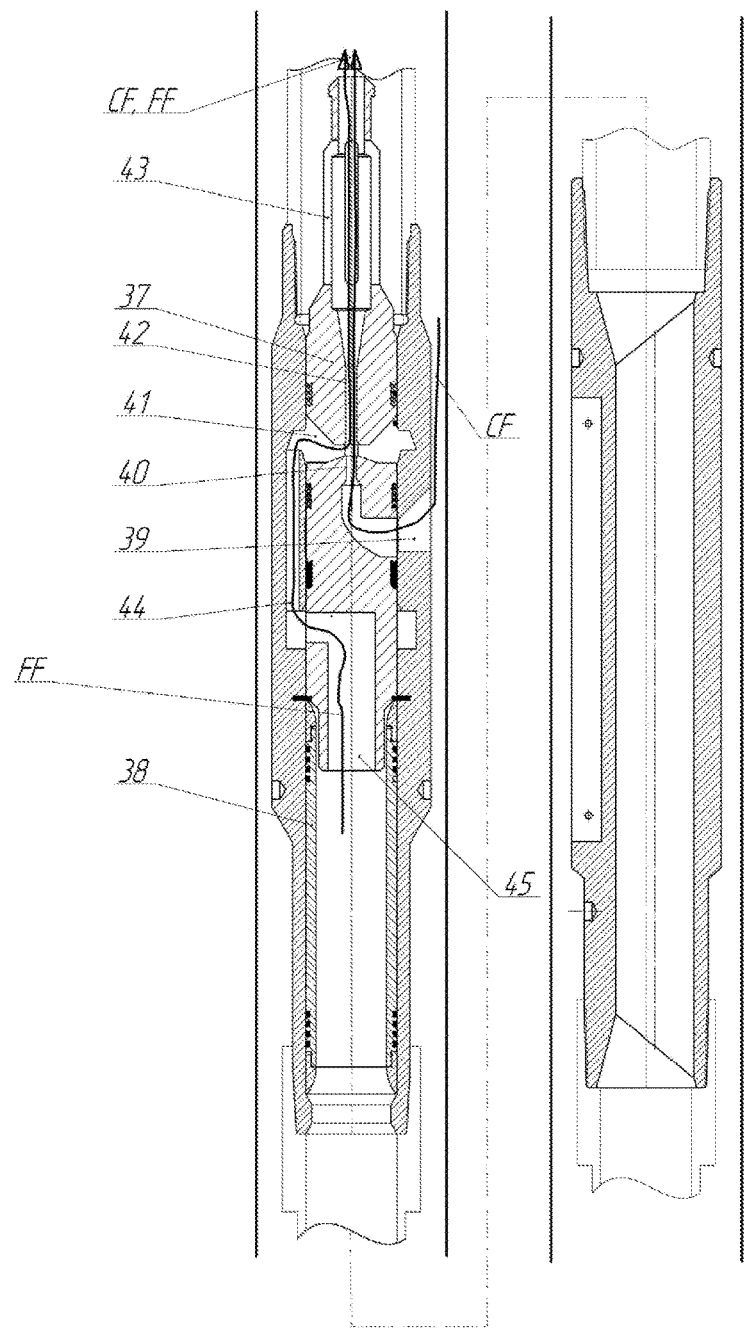
FIG. 26 is a sectional view of the jet pump, showing the operation of the jet pump.

Lastly, FIGS. 11 and 26 illustrate operation of jet pump 1. FIG. 11 is a sectional side elevation view of jet pump 1 casing seat. Jet pump 1 may preferably be inserted into the longitudinally extending assembly after the hydraulic fracturing has been completed and preliminary cleaning is performed through circulation valve 2 of the tubing interval above top packer 3.

FIG. 26 is a sectional view of jet pump 1, showing the operation of the jet pump, as follows. The jet pump insert module 37 is dropped down from the surface to rest on a movable sleeve 38 blocking the jet pump casing inlet passage 39. Pressure is created in the tubings to push the insert module 37 on a sleeve 38 downwardly to open the jet pump casing inlet passage 39.

FIG. 26 shows the operation of the jet pump where the working fluid CF goes through the inlet passage 39 into a nozzle 40, and then through a chamber 41 gets into the venturi chamber 42, and passing ports 43 gets into the tubing and goes upward to the surface. The high-speed stream within chamber 41 creates a low pressure. As a result of pressure difference between the chamber 41 and the space below the inserted jet pump module fluid FF starts moving up through the second inlet 45. The working fluid CF and the fracking fluid FF mix within the venturi chamber 42.

FIG. 6.1 shows the operation of the jet pump where the working fluid (stream A) goes through the inlet passage 39 into a nozzle 40, and then through a chamber 41 gets into the venturi chamber 42, and passing ports 43 gets into the tubing and goes upward to the surface. The high-speed stream within chamber 41 creates a low pressure. As a result of pressure difference between the chamber 41 and the space below the inserted jet pump module fluid starts moving (stream B). Streams A and B mix within the venturi chamber 42.

What is claimed is:

1. A down-hole equipment system for hydraulic fracturing, comprising:
    a longitudinally extending assembly;
    a bottom packer on the longitudinally extending assembly;
    a circulation port positioned above the bottom packer on the longitudinally extending assembly;
    a hydraulic fracturing port positioned above the circulation port on the longitudinally extending assembly;
    a top packer positioned above the hydraulic fracturing port on the longitudinally extending assembly;
    a circulation valve positioned above the top packer on the longitudinal assembly; and
    a jet pump positioned above the circulation valve on the longitudinal assembly, wherein the jet pump comprises:
    an internal venturi chamber;
    a first inlet passing from a region of the wellbore above the circulation valve through a nozzle and into the venturi chamber such that when cleaning fluid is injected downwardly into the well bore, the cleaning fluid passes upwardly through the nozzle and into the venturi chamber thereby creating a low pressure in the venturi chamber; and
    a second inlet passing from a region of the wellbore between the top and bottom packers such that fracking fluid is drawn upwardly into the low pressure area in the venturi chamber.

2. The system of claim 1, wherein each of the top and bottom packers are outwardly expandable to seal a section of a well hole.

3. The system of claim 1, wherein the top packer comprises an openable bypass passage permitting fluid and gas regulated passage therethrough.

4. The system of claim 1, further comprising:
    a dropped ball dimensioned to be received into a movable seat thereby moving the circulation port to open the circulation port, and
    a dropped ball dimensioned to be received into the movable seat thereby moving the hydraulic fracturing port to open the hydraulic fracturing port,
    wherein the ball that opens the circulation port is smaller than the ball that opens the hydraulic fracturing port.

5. The system of claim 4, wherein the hydraulic fracturing port has a plurality of outwardly facing holes that are openable when the larger ball is received into the movable seat shutting the hydraulic fracturing port.

6. The system of claim 1, wherein the circulation valve is openable by pressurizing the well bore.

7. The system of claim 1, wherein the jet pump is inserted into the longitudinally extending assembly after the hydraulic fracturing has been completed.

8. A method of hydraulic fracturing, comprising:
    placing a longitudinally extending down-hole assembly for hydraulic fracturing into a well hole; and then
    activating top and bottom packers on the longitudinally extending assembly, thereby sealing a section of the well hole between the top and bottom packers; and then
    opening a circulation port on the assembly above the bottom packer; and then
    opening a hydraulic fracturing port on the assembly between the top and bottom packers; and then
    injecting pressurized fracking fluid with proppant down through the longitudinally extending assembly and out of the hydraulic fracturing port, thereby fracturing rocks surrounding the well hole; and then
    unsealing the top packer by raising the assembly; and then
    pressurizing the well hole, thereby pushing cleaning fluid down alongside the top packer and into the space between the top and bottom packers, thereby pushing remaining fracking fluid containing proppant sitting between the top and bottom packers into the circulation port and then back up through the assembly and out of the well hole, thereby removing the remaining fracking fluid with proppant sitting between the top and bottom packers.

9. The method of claim 8, wherein for unsealing the top packer a bypass valve in the top packer is first opened by raising the assembly.

10. The method of claim 8, wherein both the hydraulic fracturing port and the circulation port are opened by ball drops and the ball dropped into the circulation port is smaller than the ball dropped into the hydraulic fracturing port.

11. The method of claim 8, further comprising:
prior to the step of unsealing the top packer:
  opening the circulation valve above the top packer,
  pressurizing the well hole, thereby pushing cleaning fluid into the circulation valve above the top packer, thereby pushing remaining fracking fluid with proppant sitting inside the tubing of the assembly above the top packer back up through the assembly and out of the well hole, and
  closing the circulation valve above the top packer.

12. The method of claim 8, further comprising:
after the steps of unsealing the top packer and pressurizing the well hole:
  repeatedly activating the top packer;
  placing a jet pump insert module into the hydraulic fracturing assembly above the top packer; and
  creating suction with the jet pump, thereby removing remaining fracking fluid and proppant sitting between the top and bottom packers.

13. A method of hydraulic fracturing, comprising:
placing a longitudinally extending down-hole assembly for hydraulic fracturing into a well hole; and then
activating top and bottom packers on the assembly, thereby sealing a section of the well hole between the top and bottom packers; and then
opening a circulation port on the assembly above the bottom packer; and then
opening a hydraulic fracturing port on the assembly between the top and bottom packers; and then
injecting pressurized fracking fluid with proppant down through the longitudinally extending assembly and out of the hydraulic fracturing port, thereby fracturing rocks surrounding the well hole; and then
opening a circulation valve above the top packer; and then
pressurizing the well hole, thereby pushing fluid into the circulation valve above the top packer, thereby pushing remaining fracking fluid with proppant sitting inside the tubing of the assembly above the top packer back up through the assembly and out of the well hole,
closing the circulation valve above the top packer; and then
inserting a jet pump into the longitudinally extending assembly; and then
pressurizing the well hole, thereby pushing fluids above the top packer into the jet pump, thereby creating suction at a circulation port above the bottom packer such that remaining fracking fluid with proppant sitting between the top and bottom packers are drawn into the circulation port and then up through the jet pump to the ground surface.

14. The method of claim 13, wherein both the hydraulic fracturing port and the circulation port are opened by ball drops and the ball dropped into the circulation port is smaller than the ball dropped into the hydraulic fracturing port.

* * * * *